(12) United States Patent
Domes et al.

(10) Patent No.: US 9,175,170 B2
(45) Date of Patent: Nov. 3, 2015

(54) METHOD FOR COATING METALLIC SURFACES WITH A COMPOSITION THAT IS RICH IN POLYMERS

(75) Inventors: Heribert Domes, Weilmunster (DE); Julia Schneider, Harburg (DE)

(73) Assignee: Chemetall GmbH, Frankfurt am Main (DE)

( * ) Notice: Subject to any disclaimer, the term of this patent is extended or adjusted under 35 U.S.C. 154(b) by 1232 days.

(21) Appl. No.: 10/546,582

(22) PCT Filed: Feb. 25, 2004

(86) PCT No.: PCT/EP2004/001829
§ 371 (c)(1), (2), (4) Date: Nov. 1, 2005

(87) PCT Pub. No.: WO2004/076568
PCT Pub. Date: Sep. 10, 2004

(65) Prior Publication Data
US 2006/0099429 A1 May 11, 2006

(30) Foreign Application Priority Data

Feb. 25, 2003 (DE) .................................. 103 08 237
Jul. 17, 2003 (DE) .................................. 103 32 744

(51) Int. Cl.
| C09D 4/00 | (2006.01) |
|---|---|
| C23C 22/48 | (2006.01) |
| C09D 5/08 | (2006.01) |
| C23C 22/50 | (2006.01) |
| C23C 22/53 | (2006.01) |
| C23C 22/60 | (2006.01) |
| C23C 22/68 | (2006.01) |
| C23C 22/74 | (2006.01) |
| C23C 22/83 | (2006.01) |

(52) U.S. Cl.
CPC .. *C09D 4/00* (2013.01); *C09D 5/08* (2013.01); *C23C 22/48* (2013.01); *C23C 22/50* (2013.01); *C23C 22/53* (2013.01); *C23C 22/60* (2013.01); *C23C 22/68* (2013.01); *C23C 22/74* (2013.01); *C23C 22/83* (2013.01); *C23C 2222/20* (2013.01); *Y02T 50/67* (2013.01); *Y10T 428/31663* (2015.04)

(58) Field of Classification Search
CPC ............ C09D 4/00; C09D 5/08; C23C 22/48; C23C 22/50; C23C 22/53; C23C 22/60; C23C 22/68; C23C 22/83; C08G 77/04; C08G 77/26
USPC ........ 427/327, 372.2, 384, 385.5, 387, 388.1, 427/388.2, 388.4, 397.7, 421.1, 428.01, 427/429, 430.1, 435, 443
See application file for complete search history.

(56) References Cited

U.S. PATENT DOCUMENTS

| 5,053,081 A | 10/1991 | Jacob |
|---|---|---|
| 5,451,431 A | 9/1995 | Purnell |
| 6,203,854 B1 | 3/2001 | Affinito |
| H1967 H * | 6/2001 | Woolf ........................... 427/288 |
| 6,482,274 B2 * | 11/2002 | Shimakura et al. ........... 148/247 |
| 6,875,479 B2 * | 4/2005 | Jung et al. ..................... 427/493 |
| 2001/0031811 A1 | 10/2001 | Li et al. |

FOREIGN PATENT DOCUMENTS

| DE | 31 51 115 A | 9/1982 |
|---|---|---|
| DE | 101 49 148 A | 5/2002 |
| EP | 0 676 420 B1 | 10/1995 |
| EP | 0 824 127 A2 | 2/1998 |
| EP | 1130132 A | 9/2001 |
| JP | 2001-311037 | 11/2001 |
| WO | WO 00/46310 A1 | 8/2000 |
| WO | WO 01/90267 A2 | 11/2001 |
| WO | WO 02/31062 A2 | 4/2002 |

* cited by examiner

*Primary Examiner* — Elena T Lightfoot
(74) *Attorney, Agent, or Firm* — Norton Rose Fulbright US LLP

(57) ABSTRACT

The invention relates to a method for coating a metallic surface with an aqueous composition for pretreating before applying another coating or for treating said metallic surface. In addition to water, the composition contains: a) at least one hydrolyzable or at least partially hydrolyzed silane; b) at least one metal chelate; c) at least one organic film former, and; d) at least one long-chain alcohol that serves as a film forming aid. The unsoiled, scoured, cleaned and/or pretreated metallic surface is brought into contact with the aqueous composition so that a film forms on the metallic surface, which is subsequently dried, compacted in part or completely by film formation and, if necessary, additionally hardened. The dried and, if necessary, additionally hardened film has a layer thickness ranging from 0.01 to 10 μm. The invention also relates to corresponding aqueous compositions.

109 Claims, No Drawings

METHOD FOR COATING METALLIC SURFACES WITH A COMPOSITION THAT IS RICH IN POLYMERS

This is a §371 of PCT/EP2004/001829 filed Feb. 25, 2004, and claims priority from German Patent Application 103 08 237.9 filed Feb. 25, 2003 and German Patent Application 103 32 744.4 filed Jul. 17, 2003.

The invention relates to a process for coating metallic surfaces with an aqueous composition containing silane and metal chelate and optionally organic film-forming agent. The invention furthermore relates to corresponding aqueous compositions and to the use of the substrates coated by the process according to the invention.

The processes most frequently employed hitherto on metals, in particular metal strip, for surface treatment or pretreatment before lacquering are based on the use of chromium(III) or/and chromium(VI) compounds together with various additives. Because of the toxicological and ecological risks which such processes involve, and moreover because of the foreseeable legal restrictions in respect of the use of chromate-containing processes, alternatives to these processes have already been sought for a relatively long time in all fields of metal surface treatment.

The use of silanes in aqueous compositions for the preparation of siloxane-rich corrosion protection coatings is known in principle. These coatings have proved themselves, but the processes for coating with an aqueous composition containing predominantly silane are in some cases difficult to use. This coating is not always formed with optimum properties. Furthermore, there may be problems in being able to characterize adequately the very thin transparent silane coatings on the metal substrate and defects thereof with the naked eye or with optical aids. The corrosion protection and the lacquer adhesion of the siloxane-rich coatings formed are very often, but not always, high and in some cases not sufficiently high for particular uses even with suitable application.

In designing silane-containing aqueous compositions, a small or large added amount of at least one component chosen from the group consisting of monomers, oligomers and polymers has moreover proved appropriate. In such compositions the nature and amount of the silane addition is sometimes of decisive importance for success. However, the added amounts of silane for this purpose are conventionally comparatively low—usually only up to 5 wt. %—and then act as a "coupling agent", where the adhesion-promoting action, in particular between the metallic substrate and lacquer and optionally between the pigment and organic lacquer constituents, should prevail, but in some cases also a low crosslinking action may occur to a minor extent. Silane additions are predominantly added to thermosetting resin systems.

Resin mixtures in which resins are blended with inorganic acids in order also to achieve in this manner a pickling attack and therefore a better contact of the resin layer directly with the metallic surface are moreover also known. These compositions have the disadvantage that because of the pickling attack during the contact between the treatment liquid (dispersion) and the substrate, contamination occurs. This leads to concentration of metals in the treatment liquid and as a result to a permanent change in the chemical composition of the treatment liquid, as a result of which the corrosion protection is significantly impaired. By the pickling attack, these metals are dissolved out of the metallic surface of the substrates to be treated.

Another disadvantage is that the surfaces can discolour to a dark colour, under certain circumstances to dark grey to anthracite-coloured, specifically in the case of aluminium or aluminium-containing alloys. The dark-discoloured metal surfaces cannot be employed for decorative uses since the discoloration itself is undesirable for aesthetic reasons. The dark coloration is visible with varying intensity, depending on the thickness of the layer applied. This effect, called darkening, should as far as possible be avoided.

DE-A-198 14 605 describes a sealing composition for metallic surfaces which contains, in addition to at least one solvent, at least one silane derivative and colloidal silica or/and colloidal silicate. In the examples, the content of silane(s) is 20 wt. % (about 200 g/l) and that of silica sol or silicate in the range from 10 to 40 wt. %. A suggested addition of wax to reduce the coefficient of friction or of organic binder as a wetting agent, such as e.g. polypropylene, polyethylene, polyethylene oxide or modified polysiloxane, or for other reasons not mentioned with binders not mentioned in more detail, was not employed in the examples. The examples mention no polymeric substances beyond the silanes.

The doctrine of DE-A1-41 38 218 is a solution containing organofunctional polysiloxane and titanic acid esters and/or titanium chelate for use as an after-dipping agent for chromated or passivated zinc-containing layers on steel components.

U.S. Pat. No. 5,053,081 relates to a process for coating a metallic surface, which has already been pretreated e.g. with a phosphate layer, with an after-rinsing solution based on a content of 3-aminopropyltriethoxysilane and, in comparison with this, a significantly lower content of titanium chelate prepared with tetraalkyl titanate, beta-diketone and alkanolamine.

DE-A1-101 49 148 describes aqueous coating compositions based on organic film-forming agent, fine inorganic particles and lubricant or/and organic corrosion inhibitor, which, in spite of the absence of chromium compounds, produced outstanding results of corrosion resistance, adhesive strength and shapability, inter alia on Galvalume® steel sheets, but nevertheless still showed an inadequate corrosion resistance of an organic film of about 1 μm layer thickness on hot-galvanized, electrolytically galvanized, Galvalume®-coated or Galfan®-coated metallic strips, that is to say on metallic surfaces which are difficult to protect against corrosion. The compositions, their constituents and the properties of the raw materials and coatings of this publication are expressly included in this Application.

The object of the invention is to overcome the disadvantages of the prior art, and in particular to propose a process for coating metallic surfaces which is also suitable for high coating speeds such as are used for metallic strips, which can be used largely or completely without chromium(VI) compounds, which is as far as possible also free from inorganic and organic acids and which as far as possible can be employed easily on a large industrial scale. The object is in particular to increase the corrosion resistance of chromate-free organic coatings of less than 10 μm, and in particular of less than 3 μm dry film thickness, such that coatings on hot-galvanized, electrolytically galvanized or Galfan®-coated metallic strips also experience a corrosion protection equivalent to that of chromate-containing organic coatings.

It has been found, surprisingly, that the addition of at least one chelate, in particular a titanium and/or zirconium chelate, to a silane-containing aqueous composition significantly improves the corrosion resistance and also the lacquer adhesion of the film formed therefrom. The addition of an organic corrosion inhibitor can usually also be omitted here—except in the case of coating of bright steel.

It has furthermore been found, surprisingly, that it was possible also to improve the corrosion resistance of the film formed from the aqueous composition containing at least one silane but no organic polymer very significantly if at least one chelate, in particular a titanium or/and zirconium chelate, is also added.

The object is achieved with a process for coating a metallic surface, in particular of aluminium, iron, copper, magnesium, nickel, titanium, tin, zinc or alloys containing aluminium, iron, copper, magnesium, nickel, titanium, tin or/and zinc, with an aqueous composition, which can be largely or completely free from chromium(VI) compounds, for pretreatment before a further coating or for treatment in which the body to be coated optionally—especially a strip or a strip section—is shaped after the coating, which is characterized in that the composition contains, in addition to water,
- a) at least one hydrolysable or at least partly hydrolysed silane,
- b) at least one metal chelate,
- c) at least one organic film-forming agent which contains at least one water-soluble or water-dispersed organic polymer or/and copolymer with an acid number in the range from 3 to 250 and wherein the content of organic film-forming agent, based on the solids content of the composition, is >45 wt. %, and
- d) at least one long-chain alcohol as a film-forming auxiliary, wherein the clean, pickled, cleaned or/and pretreated metallic surface is brought into contact with the aqueous composition and a film is formed on the metallic surface, which is then dried and partly or completely compacted by formation of a film—during which it cures, and optionally is additionally cured, wherein the dried and optionally also cured film has a layer thickness in the range from 0.01 to 10 μm, determined by detachment of a defined area of the cured film and weighing or by determination of the silicon content of the coating e.g. with x-ray fluorescence analysis and corresponding conversion.

The object is moreover achieved with an aqueous composition for pretreatment of a metallic surface before a further coating or for treatment of that surface, which is characterized in that the composition contains, in addition to water,
- a) at least one hydrolysable or at least partly hydrolysed silane,
- b) at least one metal chelate,
- c) at least one organic film-forming agent which contains at least one water-soluble or water-dispersed organic polymer or/and copolymer with an acid number in the range from 3 to 250 and
- d) at least one long-chain alcohol as a film-forming agent.

The amounts ratio of a) to b), in each case including the reaction products formed therefrom, is preferably in the range from 0.1:1 to 10:1, particularly preferably in the amounts ratio of 0.2:1 to 8:1, very particularly preferably in the amounts ratio of 0.3:1 to 7:1, in particular about 0.4:1, 0.6:1, 0.8:1, 1:1, 1.2:1, 1.6:1, 2:1, 3:1, 4:1, 5:1 or 6:1.

In each case amounts of silane(s) and chelate(s), in each case including the reaction products formed therefrom, independently of one another of 0.05 to 5 wt. %, based on the wet film, are particularly preferred, very particularly preferably in each case independently of one another amounts of 0.08 to 4 wt. %, in particular about in each case independently of one another amounts of 0.1, 0.2, 0.3, 0.5, 0.8, 1, 1.5, 2, 2.5, 3 or 3.5 wt. %.

In each case amounts of silane(s) and chelate(s), in each case including the reaction products formed therefrom, independently of one another of 0.2 to 15 wt. %, based on the solids content, are particularly preferred, very particularly preferably in each case independently of one another amounts of 0.3 to 11 wt. %, in particular about in each case independently of one another amounts of 0.5, 0.8, 1, 1.5, 2, 2.5, 3, 3.5, 4, 4.5, 5, 5.5, 6, 6.5, 7, 7.5, 8, 8.5, 9, 9.5, 10 or 10.5 wt. %.

Preferably, at least one silane is chosen which is compatible with water, i.e. that the at least one silane and, where appropriate, its hydrolysis and condensation products are miscible with the components of the aqueous composition without problems and are stable for several weeks, and that it allows formation of a defect-free wet film and dry film which, in particular, is closed, uniform and free from craters. In particular, at least one silane is chosen which renders possible a high corrosion resistance, in particular in combination with the at least one chelate chosen.

Preferably, at least one chelate is chosen that is stable for a duration of several weeks in aqueous dispersions in the presence of the other components of the aqueous composition and which renders possible a high corrosion resistance. It is furthermore advantageous if both the at least one silane and the at least one chelate on the one hand can bond chemically to the intended metallic surface which is to be brought into contact therewith and optionally can also bond chemically to the lacquer subsequently to be applied. The at least one metal chelate is, in particular, one of Al, B, Ca, Fe, Hf, La, Mg, Mn, Si, Ti, Y, Zn, Zr or/and at least one lanthanide, such as Ce, or such as a Ce-containing lanthanide mixture, particularly preferably chosen from the group consisting of Al, Hf, Mn, Si, Ti, Y and Zr.

The concentrates of the aqueous compositions containing predominantly silane and chelate and of the part components as the starting substance for polymer-containing compositions preferably have a water content in the range from 20 to 85 wt. %, in particular 30 to 80 wt. %. The concentrates preferably contain the at least one silane, including the reaction products formed therefrom, in a content in the range from 1 to 60 wt. %, particularly preferably in the range from 3 to 45 wt. %, very particularly preferably in the range from 6 to 45 wt. %, above all in the range from 8 to 32 wt. %, in particular of about 8, 10, 12, 14, 16, 18, 20, 22, 24, 26, 28, 30 or 32.5 wt. %, and the at least one chelate, optionally including the reaction products formed therefrom, in the range from 1 to 50 wt. %, particularly preferably in the range from 2 to 40 wt. %, very particularly preferably in the range from 3 to 30 wt. %, above all in the range from 5 to 25 wt. %, in particular about 7.5, 10, 12, 14, 16, 18, 20 or 22.5 wt. %.

The bath compositions of the aqueous compositions containing predominantly silane and chelate preferably have a water content in the range from 80 to 99.9 wt. %, preferably in the range from 90 to 99.8 wt. %, particularly preferably in the range from 94 to 99.7 wt. %, above all in the range from 96 to 99.6 wt. %, in particular of about 95, 95.5, 96, 96.5, 97, 97.5, 97.9, 98.2, 98.5, 98.8, 99.1 or 99.4 wt. %.

The bath compositions preferably contain the at least one silane, including the reaction products formed therefrom, in a content in the range from 0.01 to 10 wt. %, particularly preferably in the range from 0.05 to 7 wt. %, very particularly preferably in the range from 0.1 to 5 wt. %, above all in the range from 0.2 to 4 wt. %, in particular of about 0.4, 0.6, 0.8, 1.0, 1.1, 1.2, 1.3, 1.4, 1.5, 1.6, 1.7, 1.8, 1.9, 2.0, 2.1, 2.2, 2.4, 2.6, 2.8, 3.0, 3.2, 3.4, 3.6 or 3.8 wt. %, and the at least one chelate, including the reaction products possibly formed therefrom, in the range from 0.01 to 10 wt. %, particularly preferably in the range from 0.05 to 7 wt. %, very particularly preferably in the range from 0.1 to 5 wt. %, above all in the range from 0.2 to 4 wt. %, in particular of about 0.3, 0.4, 0.5, 0.6, 0.7, 0.8, 0.9, 1.0, 1.1, 1.2, 1.3, 1.4, 1.6, 1.8, 2.0, 2.2, 2.4, 2.6, 2.8, 3.0, 3.2, 3.4, 3.6 or 3.8 wt. %.

The contents of the at least one silane and of the at least one chelate, in each case including the reaction products formed therefrom, in particular those of titanium, hafnium or/and zirconium, preferably make up at least 20 wt. %, in particular at least 30 wt. %, particularly preferably at least 40 wt. %, very particularly preferably at least 50 wt. %, above all in each case at least 60, 70, 80, 90, 94, 95, 96, 97, 98 or 99 wt. % of the solids contents of this composition. This composition particularly preferably substantially contains water, in each case at least one silane and/or reaction products thereof, at least one chelate, where appropriate including the reaction products formed therefrom, and optionally contents of substances chosen from the group consisting of alcohols, acids, such as carboxylic and fatty acids, such as acetic acid, and/or mineral acids, and other substances which influence the pH, such as ammonia, and additives and impurities. The total content of further compounds, including additives, in addition to silane and chelate is usually up to 20 wt. % of the solids content of silane and chelate, preferably up to 15 wt. %, particularly preferably up to 10 wt. %, very particularly preferably up to 5 wt. %, above all up to 1 or 2 wt. %.

Although the ratio of the at least one silane, including the reaction products formed therefrom, to the at least one chelate, optionally including the reaction products formed therefrom, can preferably be in the range from 0.8:1 to 1.2:1, it has surprisingly become clear that this ratio can also be, in particular, in the range from 0.2:1 to 0.5:1 or 2:1 to 5:1, since in certain situations there may be an optimum there.

The pH of this bath composition can be, in particular, in the range from 3 to 9.5, preferably in the range from 3.5 to 9, in particular in the range from 4 to 8.8. To adjust the pH, inter alia, an addition of a weak acid or of a dilute strong acid or an acid mixture can be added. In particular, at least one acid, such as carboxylic or fatty acids, such as acetic acid, or/and mineral acids, and other substances which influence the pH, such as ammonia, can be used. The bath composition can in some cases be adjusted down to pH values of about 3.5 by addition of acid if the chemical system tolerates the pH chosen and remains stable. However, if the acid is added only for neutralization, no or virtually no pickling attack takes place. A solvent, such as an alcohol, can preferably also be added to stabilize the silane.

The coatings formed with these bath compositions typically have a layer thickness in the range from 0.01 to 1 μm or to 0.6 μm, usually 0.015 to 0.25 μm.

The addition of the at least one silane a) offers the advantage that adhesion bridges are formed between the substrate and the dried protective film and to lacquer layers or/and coatings of plastic possibly subsequently applied, as a result of which an improved lacquer adhesion is also achieved. A further advantage is that suitable silanes/siloxanes generate crosslinkings like adhesion bridges within the dried protective film, which considerably improve the strength and/or the flexibility of the coating composite and the adhesion to the substrate, as a result of which an improved adhesion is achieved in many lacquer systems.

The aqueous composition which contains predominantly chelate and silane or predominantly synthetic resin and in addition chelate and silane preferably contains in each case at least one acyloxysilane, one alkoxysilane, one silane with at least one amine group, such as an aminoalkylsilane, one silane with at least one succinic acid group or/and succinic acid anhydride group, one bis-silyl-silane, one silane with at least one epoxide group, such as a glycidoxysilane, one (meth)acrylato-silane, one multi-silyl-silane, one ureidosilane, one vinylsilane or/and at least one silanol or/and at least one siloxane of a composition corresponding chemically to the abovementioned silanes. The reaction products of the silanes are known in principle in such systems and are therefore not mentioned individually. They are therefore also not referred to further in the following, but are included under the term "silane(s)".

The composition can contain e.g. at least one silane mixed with a content of at least one alcohol, such as ethanol, methanol or/and propanol, of up to 8 wt. %, based on the silane content, preferably up to 5 wt. %, particularly preferably up to 1 wt. %, very particularly preferably up to 0.5 wt. %. In particular, the mixture can contain e.g. at least one silane chosen from at least one amino-silane, such as e.g. bis-amino-silane, without or with at least one alkoxy-silane, such as e.g. trialkoxy-silyl-propyl-tetrasulfane, or at least one vinylsilane and at least one bis-silyl-aminosilane or at least one bis-silyl-polysulfur-silane and/or at least one bis-silyl-aminosilane or at least one aminosilane and at least one multi-silyl-functional silane. Those silanes/siloxanes which have a chain length in the range from 2 to 5 C atoms and contain a functional group which is suitable for reaction with polymers are preferred in particular.

The aqueous composition preferably contains at least one silane chosen from the group consisting of
glycidoxyalkyltrialkoxysilane,
methacryloxyalkyltrialkoxysilane,
(trialkoxysilyl)alkyl-succinic acid-silane,
aminoalkylaminoalkylalkyldialkoxysilane,
(epoxycycloalkyl)alkyltrialkoxysilane,
bis-(trialkoxysilylalkyl)amine,
bis-(trialkoxysilyl)ethane,
(epoxyalkyl)trialkoxysilane,
aminoalkyltrialkoxysilane,
ureidoalkyltrialkoxysilane,
N-(trialkoxysilylalkyl)alkylenediamine,
N-(aminoalkyl)aminoalkyltrialkoxysilane,
N-(trialkoxysilylalkyl)dialkylenetriamine,
poly(aminoalkyl)alkyldialkoxysilane,
tris(trialkoxysilyl)alkyl isocyanurate,
ureidoalkyltrialkoxysilane and
acetoxysilane.

The aqueous composition preferably contains at least one silane chosen from the group consisting of
3-glycidoxypropyltriethoxysilane,
3-glycidoxypropyltrimethoxysilane,
3-methacryloxypropyltriethoxysilane,
3-methacryloxypropyltrimethoxysilane,
3-(triethoxysilyl)propyl-succinic acid-silane,
aminoethylaminopropylmethyldiethoxysilane,
aminoethylaminopropylmethyldimethoxysilane,
beta-(3,4-epoxycyclohexyl)ethyltriethoxysilane,
beta-(3,4-epoxycyclohexyl)ethyltrimethoxysilane,
beta-(3,4-epoxycyclohexyl)methyltriethoxysilane,
beta-(3,4-epoxycyclohexyl)methyltrimethoxysilane,
gamma-(3,4-epoxycyclohexyl)propyltriethoxysilane,
gamma-(3,4-epoxycyclohexyl)propyltrimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
gamma-aminopropyltriethoxysilane,
gamma-aminopropyltrimethoxysilane,
gamma-ureidopropyltrialkoxysilane,
N-(3-(trimethoxysilyl)propyl)ethylenediamine,
N-beta-(aminoethyl)-gamma-aminopropyltriethoxy-silane,
N-beta-(aminoethyl)-gamma-aminopropyltrimethoxy-silane, N-(gamma-triethoxysilylpropyl)diethylenetriamine,
N-(gamma-trimethoxysilylpropyl)diethylenetriamine,
N-(gamma-triethoxysilylpropyl)dimethylenetriamine,
N-(gamma-trimethoxysilylpropyl)dimethylenetriamine,
poly(aminoalkyl)ethyldialkoxysilane,
poly(aminoalkyl)methyldialkoxysilane,
tris(3-(triethoxysilyl)propyl)isocyanurate,
tris(3-(trimethoxysilyl)propyl)isocyanurate and
vinyltriacetoxysilane.

The silanes contained in the aqueous composition (concentrate or bath) are monomers, oligomers, polymers, copolymers or/and reaction products with further components on the basis of hydrolysis reactions, condensation reactions or/and further reactions. The reactions take place above all in the solution, during drying or optionally curing of the coating. In the context of this Application, the term "silane" is used here for silanes, silanols, siloxanes, polysiloxanes and reaction products and derivatives thereof, which are often "silane" mixtures. Because of the often very complex chemical reactions which occur here, and the very expensive analyses and working, the particular further silanes or other reaction products cannot be described.

Instead of a content of at least one fluorine-free silane in the content of silanes, however, this content may contain only fluorine-containing silanes, or at least, instead of fluorine-free silanes, at least one fluorine-containing silane.

The aqueous composition preferably then contains at least one silane chosen from the fluorine-containing silanes: from in each case at least one acyloxysilane, one alkoxysilane, one silane having at least one amino group, such as an aminoalkylsilane, one silane having at least one succinic acid group or/and succinic acid anhydride group, one bis-silyl-silane, a silane having at least one epoxide group, such as a glycidoxysilane, one (meth)acrylato-silane, one multi-silyl-silane, one ureidosilane, one vinylsilane or/and at least one silanol or/and at least one siloxane or polysiloxane of a composition which corresponds chemically to the abovementioned silanes, which in each case contains at least one group having one or having at least one fluorine atom.

In particular, the aqueous composition then contains at least one fluoroalkoxyalkylsilane, at least one silane having 1, 2, 3, 4, 5, 6, 7, 8, 9, 10, 11, 12 or 13 fluorine atoms per silane, at least one perfluorinated silane, at least one mono-fluorosilane, at least one fluorosilane based on ethoxysilane or/and based on methoxysilane or/and at least one fluorosilane having at least one functional group, such e.g. an amino group, in particular as a cocondensate, such as e.g.
a fluoroalkyldialkoxysilane,
a fluoroaminoalkylpropyltrialkoxysilane,
a fluoromethanesulfonate,
a fluoropropylalkyldialkoxysilane,
a triphenylfluorosilane, a trialkoxyfluorosilane,
a trialkylfluorosilane or/and
a tridecafluorooctyltrialkoxysilane.

The composition particularly preferably then contains at least one fluorine-containing silane which contains at least two amino groups and at least one optionally fluorinated ethyl or/and at least one optionally fluorinated methyl group.

The content of the at least one silane, including the reaction products formed therefrom, in the aqueous composition is preferably 0.1 to 80 g/l, in particular 0.2 to 50 g/l, particularly preferably 0.3 to 35 g/l, very particularly preferably 0.5 to 20 g/l, above all 1 to 10 g/l.

Preferably, the bath compositions which have a relatively low or high content of film-forming agent contain the silanes, including the reaction products optionally formed therefrom with other components, in a content in the range from 0.01 to 10 wt. %, particularly preferably in the range from 0.05 to 7 wt. %, very particularly preferably in the range from 0.1 to 5 wt. %, above all in the range from 0.2 to 4 wt. %, in particular of about 0.4, 0.6, 0.8, 1.0, 1.1, 1.2, 1.3, 1.4, 1.5, 1.6, 1.7, 1.8, 1.9, 2.0, 2.1, 2.2, 2.4, 2.6, 2.8, 3.0, 3.2, 3.4, 3.6 or 3.8 wt. %, and the at least one chelate, including the reaction products optionally formed therefrom, in the range from 0.01 to 10 wt. %, particularly preferably in the range from 0.05 to 7 wt. %, very particularly preferably in the range from 0.1 to 5 wt. %, above all in the range from 0.2 to 4 wt. %, in particular of about 0.3, 0.4, 0.5, 0.6, 0.7, 0.8, 0.9, 1.0, 1.1, 1.2, 1.3, 1.4, 1.6, 1.8, 2.0, 2.2, 2.4, 2.6, 2.8, 3.0, 3.2, 3.4, 3.6 or 3.8 wt. %.

The content of the at least one metal chelate b), optionally including the reaction products formed therefrom, in the aqueous composition is preferably 0.05 to 80 g/l, in particular 0.1 to 50 g/l.

The at least one metal chelate is preferably chosen from chelate complexes based on acetylacetonates, acetoacetates, acetonates, alkylenediamines, amines, lactates, carboxylic acids, citrates or/and glycols.

The at least one metal chelate is preferably based on
acetylacetonate,
alkali metal lactate,
alkanolamine,
alkyl acetoacetate,
alkylenediamine tetraacetate,
ammonium lactate,
citrate,
dialkyl citrate,
dialkyl ester-citrate,
dialkylenetriamine,
diisoalkoxybisalkyl acetoacetate,
diisopropoxybisalkyl acetoacetate,
di-n-alkoxy-bisalkyl acetoacetate,
hydroxyalkylenediamine triacetate,
trialkanolamine or/and
trialkylenetetramine.

These metal chelates serve in particular to stabilize the organometallic compound in water and to bond to the metallic surface or to the lacquer or to a corresponding coating applied. They are particularly suitable if they have only a low reactivity in the aqueous composition and if they are at least partly decomposed within the process conditions used and the metal ions for the bonding or/and chemical reaction are liberated. If they are too reactive, the organometallic compounds react prematurely with other chemical compounds, such as silanes. Preferably, the chelates are hydrophilic, stable to hydrolysis, stable to water or/and form stable hydrolysates. Preferably, a silane or a chelate is chosen which is compatible with water and moreover with the organic film-forming agent chosen and which has the same properties as mentioned before for the silane or chelate.

Preferably, the amounts ratio of a) to b), in each case including the reaction products formed therefrom, is in the range from 0.1:1 to 10:1, particularly preferably in the amounts ratio of 0.2:1 to 8:1, very particularly preferably in the amounts ratio of 0.3:1 to 7:1, in particular about 0.4:1, 0.6:1, 0.8:1, 1:1, 1.2:1, 1.6:1, 2:1, 3:1, 4:1, 5:1 or 6:1.

Particularly preferably, in each case amounts of silane(s) and chelate(s), in each case including the reaction products formed therefrom, are contained independently of one another in the range from 0.05 to 5 wt. %, based on the wet film, very particularly preferably in each case independently of one another amounts of 0.08 to 4 wt. %, in particular about in each case independently of one another amounts of 0.1, 0.2, 0.3, 0.5, 0.8, 1, 1.5, 2, 2.5, 3 or 3.5 wt. %.

Particularly preferably, in each case amounts of silane(s) and chelate(s), in each case including the reaction products formed therefrom, are contained independently of one another in the range from 0.2 to 15 wt. %, based on the dry substance content, very particularly preferably in each case independently of one another amounts of 0.3 to 11 wt. %, in particular about in each case independently of one another amounts of 0.5, 0.8, 1, 1.5, 2, 2.5, 3, 3.5, 4, 4.5, 5, 5.5, 6, 6.5, 7, 7.5, 8, 8.5, 9, 9.5, 10 or 10.5 wt. %.

In particular, in the compositions having a comparatively high film-forming agent content, an amounts ratio of components [a)+b)]:c), in each case including the reaction products formed therefrom and based on the wet film, of 1:70 or of 2:70 to 20:70 is particularly preferred, very particularly preferably in an amounts ratio of 3.5:70 to 17:70, in particular about 5:70, 6:70, 7:70, 8:70, 9:70, 10:70, 11:70, 12:70 and 14:70. It may be preferable here for either component a) to component b), or vice versa, to assume values of the content which are higher by the factor 1.2 to 4 than that of the other component. An amounts ratio of components [a)+b)]:c), in each case including the reaction products formed therefrom and based on the solids content, of 2:70 to 20:70 is particularly preferred, very particularly preferably in an amounts ratio of 3.5:70 to 17:70, in particular about 5:70, 6:70, 7:70, 8:70, 9:70, 10:70, 11:70, 12:70 and 14:70.

In particular, in the compositions having a relatively low film-forming agent content, however, the amounts ratio of components [a)+b)]:c), in each case including the reaction products formed therefrom and based on the wet film, can be particularly preferably in the range from ≥0.2:7 and up to 20:7, very particularly preferably in the amounts ratio of ≥0.5:7 and up to 12:7 or of ≥1:7 and up to 8:7, in particular about 0.4:7, 0.6:7, 0.8:7, 1.2:7, 1.5:7, 2:7, 3:7, 4:7, 5:7, 6:7, 7:7, 9:7, 10:7, 11:7, 13:7, 14:7 and 16:7. It may be preferable here for either component a) to component b) or vice versa to assume content values which are higher than the other component by a factor of 1.2 to 4.

The contents of component a), including the reaction products formed therefrom and based on the solids content, are particularly preferably in the range from 0.4 to 10 wt. %, very particularly preferably in the range from 0.8 to 8 wt. %, in particular about 1.2, 1.5, 1.8, 2.1, 2.4, 2.7, 3, 3.3, 3.6, 3.9, 4.2, 4.5, 4.8, 5.1, 5.5, 6, 6.5, 7 or 7.5 wt. %.

The contents of component b), including the reaction products formed therefrom and based on the solids content, are particularly preferably in the range from 0.3 to 10 wt. %, very particularly preferably in the range from 0.8 to 8 wt. %, in particular about 1.2, 1.5, 1.8, 2.1, 2.4, 2.7, 3, 3.3, 3.6, 3.9, 4.2, 4.5, 4.8, 5.1, 5.5, 6, 6.5, 7 or 7.5 wt. %.

In particular, in the compositions having a comparatively high film-forming agent content, the contents of component c), based on the solids content, are particularly preferably in the range from 10 to 95 wt. %, very particularly preferably in the range from 30 to 90 wt. %, in particular about 35, 40, 45, 50, 55, 60, 63, 66, 69, 72, 75, 78, 81, 84 or 87 wt. %.

In particular, in the compositions having a comparatively high film-forming agent content, the contents of component d)—at least one long-chain alcohol—based on the solids content, are particularly preferably in the range from 0.01 to 2 wt. %, very particularly preferably in the range from 0.1 to 1 wt. %, in particular about 0.12, 0.15, 0.18, 0.21, 0.24, 0.27, 0.30, 0.33, 0.36, 0.39, 0.42, 0.45, 0.48, 0.51, 0.55, 0.60, 0.65, 0.7, 0.75, 0.8, 0.9 or 0.95 wt. %.

The aqueous composition, which can serve as a bath composition or/and as a concentrate, preferably contains the organic film-forming agent c) in a content of 0.1 to 980 g/l, particularly preferably in a range from 2 to 600 g/l, very particularly preferably 50 to 550 g/l, in particular 150 to 450 g/l. Preferably, 2 to 100 parts of the organic film-forming agent are added, particularly preferably 10 to 60 parts, very particularly preferably 15 to 45 parts, per 100 parts by weight of water. In particular, in the case of the compositions having a relatively low film-forming agent content, however, the aqueous composition, which can serve as a bath composition or/and as a concentrate, preferably contains the organic film-forming agent c) in a content of ≥0.01 and up to 98 g/l, particularly preferably in a range from ≥0.1 and up to 60 g/l, very particularly preferably from ≥0.5 and up to 50 g/l, in particular from ≥2 and up to 45 g/l.

Under certain circumstances, the highest contents of organic film-forming agent can occur in particular in UV-curing systems without or in systems with only low volatile contents, such as organic solvents or/and residual monomers. Coatings which are predominantly or solely film-formed during drying or optionally cured in part thermo-physically are particularly preferred for the process according to the invention. In the context of this Application, the term copolymers preferably also includes block copolymers and graft copolymers.

The organic film-forming agent preferably contains at least a proportion of at least one polymer or/and at least one copolymer with an acid number in the range from 3 to 120, particularly preferably in the range from 3 to 80, very particularly preferably in the range from 4 to 60.

The organic film-forming agent preferably contains at least one proportion of at least one polymer or/and at least one copolymer with a minimum film-forming temperature MFT in the range from −10 to +99° C., particularly preferably in the range from 0 to 90° C., in particular from 5° C.; it is very particularly advantageous if the organic film-forming agent contains at least two in particular thermoplastic polymers or/and copolymers at least in the initial stage—since the thermoplastic constituents can at least partly lose or reduce their thermoplastic properties during the further treatment and reaction—which—where a minimum film-forming temperature can be stated—have a minimum film-forming temperature in the range from 5 to 95° C., in particular of at least 10° C., where at least one of these polymers or/and copolymers, compared with at least a second of these polymers or/and copolymers, A) has a minimum film-forming temperature which differs from that of the other component by at least 20° C., B) has a glass transition temperature which differs from that of the other component by at least 20° C., or/and C) has a melting point which differs from that of the other component by at least 20° C. Preferably, one of these at least two components has a film-forming temperature in the range from 10 to 40° C. and the other a film-forming temperature in the range from 45 to 85° C. Long-chain alcohols can help here to lower the glass transition temperatures temporarily and optionally also to match them somewhat to one another. After application, the long-chain alcohols can escape and then leave behind a film of higher glass transition temperature than during the application. These dried films are then not too flexible and too tacky. The glass transition temperatures and the melting points of these synthetic resins are often about in the region of the film-forming temperature, that is to say usually in the range from 0 to 110° C.

In another preferred embodiment, a mixture of organic film-forming agents in which at least some of the film-forming agents have a glass transition temperature $T_g$ of substantially the same or/and a similar $T_g$ can be employed. It is particularly preferable here for at least some of the organic film-forming agents to have a glass transition temperature $T_g$ in the range from 10 to 70° C., very particularly preferably in the range from 15 to 65° C., in particular in the range from 20 to 60° C. The organic film-forming agent then preferably contains at least a proportion of at least one polymer or/and at least one copolymer having a minimum film-forming temperature MFT in the range from −10 to +99° C., particularly preferably in the range from 0 to 90° C., in particular from 5° C. or from 10° C. It is particularly preferable here for at least two, if not all, of the organic film-forming agents to have a minimum film-forming temperature in one of these temperature ranges—if a minimum film-forming temperature can be stated.

It is particularly advantageous if all the organic film-forming agents form a film during drying. It is particularly preferable if synthetic resins which have thermoplastic properties to the extent of at least 80 wt. %, in particular to the extent of at least 90 wt. %, are added to the aqueous composition.

The organic film-forming agent is preferably formed from at least one component in the form of in each case at least one solution, dispersion, emulsion, microemulsion and/or suspension which is added to the aqueous composition. The term dispersion here also includes the sub-terms emulsion, solution, microemulsion and suspension.

The acid number of the synthetic resins is preferably 3 to 100, particularly preferably 3 to 60 or 4 to 50. In particular, copolymers with an acid number in the range from 3 to 50 are added to the aqueous composition. The components of the organic film-forming agent which are to be added are optionally already partly neutralized. The organic film-forming agent can preferably contain a proportion of at least one copolymer with an acid number in the range from 3 to 80, in particular to the extent of at least 50 wt. % of the synthetic resins added. In a high range of the acid number it is usually not necessary to stabilize a film-forming agent cationically, anionically or/and sterically. At a low acid number, however, such a stabilization is often necessary. It is then advantageous to employ already (partly) stabilized synthetic resins or mixtures thereof.

The aqueous composition preferably contains at least one synthetic resin, such as organic polymer, copolymer or/and mixture thereof, in particular a synthetic resin based on acrylate, ethylene, polyester, polyurethane, silicone polyester, epoxide, phenol, styrene, melamine-formaldehyde, urea-formaldehyde or/and vinyl. The organic film-forming agent can preferably be a synthetic resin mixture of at least one polymer or/and at least one copolymer, which in each case independently of one another contains a proportion of synthetic resin based on acrylate, epoxide, ethylene, urea-formaldehyde, phenol, polyester, polyurethane, styrene, styrene-butadiene or/and vinyl. This can also be here a cationically, anionically or/and sterically stabilized synthetic resin or polymer or/and dispersion thereof or even solution thereof. The term acrylate in the context of this Application includes acrylic acid ester, Application includes acrylic acid ester, polyacrylic acid, methacrylic acid ester and methacrylate.

The organic film-forming agent can preferably contain at least one component based on
  acrylic-polyester-polyurethane copolymer,
  acrylic-polyester-polyurethane-styrene copolymer,
  acrylic acid ester,
  acrylic acid ester-methacrylic acid ester, optionally with free acids or/and
  acrylonitrile,
  ethylene-acrylic mixture,
  ethylene-acrylic copolymer,
  ethylene-acrylic-polyester copolymer,
  ethylene-acrylic-polyurethane copolymer,
  ethylene-acrylic-polyester-polyurethane copolymer
  ethylene-acrylic-polyester-polyurethane-styrene copolymer,
  ethylene-acrylic-styrene copolymer
  polyester resins with free carboxyl groups combined with melamine-formaldehyde resins,
  a synthetic resin mixture or/and copolymer based on acrylate and styrene,
  a synthetic resin mixture or/and copolymer based on styrene-butadiene,
  a synthetic resin mixture or/and copolymer of acrylate and epoxide,
  based on an acrylic-modified polyester containing carboxyl groups together with melamine-formaldehyde and ethylene-acrylic copolymer,
  polycarbonate-polyurethane,
  polyester-polyurethane,
  styrene,
  styrene-vinyl acetate,
  vinyl acetate,
  vinyl ester or/and
  vinyl ether.

However, the organic film-forming agent can also preferably contain as the synthetic resin a content of organic polymer, copolymer or/and mixtures thereof based on polyethyleneimine, polyvinyl alcohol, polyvinylphenol, polyvinylpyrrolidone or/and polyaspartic acid, in particular copolymers with a phosphorus-containing vinyl compound. A conductive polymer is preferably also added to the aqueous composition.

A synthetic resin based on acrylate or based on ethylene-acrylic acid with a melting point in the range from 60 to 95° C. or a synthetic resin with a melting point in the range from 20 to 160° C., in particular in the range from 60 to 120° C., is very particularly preferred.

Preferably, at least 30 wt. % of the organic film-forming agent added can contain thermoplastic resins from which films can be formed, particularly preferably to the extent of at least 50 wt. %, very particularly preferably to the extent of at least 70 wt. %, above all to the extent of at least 90 or to the extent of at least 95 wt. %. In addition, the organic film-forming agent can also contain contents, in certain circumstances residual contents, of in each case at least one monomer, oligomer, emulsifier, further additive for dispersions, one curing agent, photoinitiator or/and one cationically polymerisable substance. The content of monomer, oligomer, emulsifier and further additive for dispersions is usually less than 5 wt. %, often less than 2 wt. %, possibly less than 1 wt. %. The composition of curing agents and correspondingly crosslinkable substances then optionally also added and the corresponding measures for this are known in principle.

The molecular weights of the synthetic resins added can preferably be in the range of at least 1,000 u, particularly preferably of at least 5,000 u, very particularly preferably from 20,000 to 200,000 u. The individual thermoplastic components of the organic film-forming agent which are added to the aqueous composition preferably have molecular weights in the range from 20,000 to 200,000 u, in particular in the range from 50,000 to 150,000 u.

The organic film-forming agent can preferably contain at least 40 wt. % of high-molecular-weight polymers, particularly preferably at least 55 wt. %, very particularly preferably at least 70 wt. %, above all at least 85 wt. %, in particular at least 95 wt. %. In particular, if at least 85 wt. % of the organic film-forming agent comprises high-molecular-weight polymers, it is usually not necessary to add curing agents, such as isocyanates, or photoinitiators, such as benzophenones, for thermal or free-radical crosslinking, and correspondingly crosslinkable synthetic resins in order to achieve the outstanding properties of the coating according to the invention, since it is then possible to form, by the film formation, a closed, solid, high-quality film without carrying out crosslinking.

During film formation, which takes place in particular during drying, the organic microparticles add on to one another and compact to form a closed pore-free film, if the choice of polymers and film-forming auxiliary is suitable and the process is operated under suitable conditions. The expert is familiar in principle with these classes of substance and working conditions. The fact that this film can have exceptionally high-quality properties, in spite of such a low layer thickness, preferably in the range from 0.5 to 3 μm, is demonstrated by the embodiment examples. To the knowledge of the Applicant, no substantially organic, chromate-free coating with a layer thickness of less than 4 μm dry film thickness has hitherto been disclosed for the coating on metallic strips of such high lacquer adhesion and corrosion resistance which predominantly contains polymers which have undergone film formation. The coating according to the invention is at least equivalent to a chromate-containing organic coating.

The final drying of such films can take many days, while substantial drying can already be completed in a few seconds. Curing here can, under certain circumstances, take several weeks until the final drying and curing state is achieved if no thermal or free-radical crosslinking occurs here. If required, the curing can additionally be accelerated or intensified, as a result of crosslinking, by irradiation, e.g. with UV radiation, or by heating, or/and also to a small extent by addition of and reaction with e.g. compounds containing free NCO groups with the hydroxyl groups of the polymers containing hydroxyl groups.

The coating is preferably largely or completely cured by drying and film formation. Alternatively, however, the coating can be hardened or cured partly by drying and film formation and partly by actinic radiation, cationic polymerization or/and thermal crosslinking. In this case, at least one photoinitiator or/and at least one curing agent and correspondingly crosslinkable resin are optionally added to the aqueous composition.

The pH of the organic film-forming agent in an aqueous formulation, without addition of further compounds, is usually in the range from 0.5 to 12. The pH of the aqueous composition which contains predominantly synthetic resins and also silane and chelate as solids contents is preferably in the range from 1 to 6 or 6 to 10.5—depending on whether the procedure takes place in the acid or rather basic range, particularly preferably in the range from 6.5 to 9.5, very particularly preferably in the range from 7 to 9.2.

In one embodiment variant, the organic film-forming agent preferably contains only water-soluble synthetic resins, in particular those which are stable in solutions with pH values of ≤9, or/and the organic film-forming agent contains at least one synthetic resin which contains hydroxyl groups. However, if the pH should have fallen due to storage of the synthetic resins or mixtures, it may be helpful to bring the pH, especially that of the dispersion which is otherwise ready-to-use, back into a more alkaline range e.g. by addition of sodium hydroxide solution. The organic film-forming agent can also be of a composition such that it contains—optionally only—water-soluble synthetic resin, in particular one which is stable in solutions with pH values of ≤5.

Preferably, the acid groups of the synthetic resins are or/and will be neutralized with ammonia, with amines or alkanolamines, such as e.g. morpholine, dimethylethanolamine, diethylethanolamine or triethanolamine, or/and with alkali metal compounds, such as e.g. sodium hydroxide. These additives then act as a stabilizer.

Film formation is understood as meaning film formation from a material with a high organic content, such as a polymer dispersion, during which above all polymer particles are converted into a uniform film, preferably at room temperature or slightly elevated temperature. Fusion of the comparatively large polymer particles is often referred to here. Film formation takes place here from an aqueous medium during drying and optionally with plasticizing of the polymer particles by the remaining film-forming auxiliary. The film formation can be improved by the use of thermoplastic polymers or copolymers or/and by addition of substances which serve as temporary plasticizers. Film-forming auxiliaries act as specific solvents which soften the surface of the polymer particles and thus render possible fusion thereof. It is advantageous here if these plasticizers on the one hand remain in the aqueous composition for a sufficiently long period of time to be able to act on the polymer particles for a long period of time and then evaporate and thus escape from the film. It is furthermore advantageous if a residual water content is also present for a sufficiently long period of time during the drying process. In a suitable film formation, a transparent film is formed, but no milky-white or even pulverulent film, which is an indication of an impaired film formation. For film formation which is as perfect as possible, the temperature of the wet film applied to a surface must be above the minimum film temperature (MFT), since only then are the polymer particles soft enough to coalesce. It is particularly advantageous here if these plasticizers do not or virtually do not modify the pH of the aqueous composition. The choice of suitable film-forming auxiliary is not easy here, a mixture of at least two film-forming auxiliaries often being necessary. Film-forming auxiliaries which are particularly advantageous are so-called long-chain alcohols, in particular those having 4 to 20 C atoms, such as a butanediol, a butyl glycol, a butyl diglycol, an ethylene glycol ether, such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether, diethylene glycol hexyl ether, or a polypropylene glycol ether, such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether, propylene glycol phenyl ether, trimethylpentanediol diisobutyrate, a polytetrahydrofuran, a polyether-polyol or/and a polyester-polyol. In contrast to film formation, temperatures of at least 120° C. are conventionally required for crosslinking for thermosetting organic coatings.

In the processes according to the invention relating to compositions which contain predominantly chelate and silane or predominantly synthetic resin and in addition chelate and silane, the aqueous composition can contain at least one component e) chosen from the group consisting of $e_1$) at least one inorganic compound in particle form with an average particle diameter, measured on a scanning electron microscope, in the range from 0.005 to 0.3 μm diameter, $e_2$) at least one lubricant, $e_3$) at least one organic corrosion inhibitor, $e_4$) at least one anticorrosion pigment, $e_5$) at least one agent for neutralization or/and for steric stabilization of the synthetic resins, $e_6$) at least one organic solvent, e₇) at least one siloxane and
e₈) at least one chromium(VI) compound.

Preferably, a finely divided powder, a dispersion or a suspension, such as e.g. a carbonate, oxide, silicate or sulfate, in particular colloidal or/and amorphous particles, is added as the inorganic compound in particle form $e_1$). Particles based on at least one compound of aluminium, barium, cerium, calcium, lanthanum, silicon, titanium, yttrium, zinc or/and zirconium are preferably added as the inorganic compound in particle form. Particles based on aluminium oxide, barium sulfate, cerium dioxide, silicon dioxide, silicate, titanium oxide, yttrium oxide, zinc oxide or/and zirconium oxide are preferably added as the inorganic compound in particle form.

Preferably, particles with an average particle size in the range from 6 to 200 nm are used as the inorganic compound in particle form, particularly preferably in the range from 7 to 150 nm, very particularly preferably in the range from 8 to 90 nm, even more preferably in the range from 8 to 60 nm, above all preferably in the range from 10 to 25 nm. These particles can also be in the form of a gel or sol. The particles can be stabilized e.g. under alkaline conditions, in order to achieve a better dispersion. An addition of boron for dispersing of the inorganic compound in particle form was not necessary and also has not been used in the examples. It is preferable for larger particles to have a rather platelet-shaped or longitudinal grain form.

The aqueous composition, which can serve as a bath composition or/and as a concentrate, preferably contains the at least one inorganic compound in particle form in a content of 0.1 to 500 g/l, particularly preferably in a range from 10 to 200 g/l, very particularly preferably 30 to 100 g/l, above all in the range from 3 to 60 g/l. Preferably, 0.1 to 50 parts of the at least one inorganic compound in particle form, particularly preferably 0.5 to 20 parts, very particularly preferably 0.8 to 10 parts, are added per 100 parts by weight of water. Among the inorganic compounds in particle form, those which maintain the transparency of the coating according to the invention, that is to say are colourless or white, such as e.g. aluminium oxide, barium sulfate, silicate, silicon dioxide, colloidal silicon dioxide, zinc oxide or/and zirconium oxide, are preferred in particular in order to maintain the visual character of the metallic surface visibly as far as possible without falsification.

Particles with a relatively high or high electrical conductivity, which are optionally also added, such as those of iron oxide, iron phosphide, tungsten, zinc and zinc alloy, can also be chosen for use for welding so that they have an average particle size such that they optionally project somewhat more out of the layer according to the invention.

The ratio of the contents of organic film-forming agent to contents of inorganic compounds in particle form in the aqueous composition can vary within wide ranges; in particular, it can be ≤25:1. Preferably, this ratio is in a range from ≥0.05:1 and up to 15:1, particularly preferably in a range from ≥0.2:1 and up to 12:1, very particularly preferably in a range from >0.5:1 and up to 10:1, in particular in a range from ≥1:1 and up to 8:1.

The ratio of the contents of at least one silane to contents of inorganic compounds in particle form in the aqueous composition can likewise vary within wide limits; in particular, it can be ≤25:1. This ratio is preferably in a range from ≥0.01:1 and up to 15:1, particularly preferably in a range from ≥0.05:1 and up to 8:1, very particularly preferably in a range from ≥0.08:1 and up to 4:1, in particular in a range from ≥0.1:1 and up to 2:1.

Preferably, at least one wax chosen from the group consisting of paraffins, polyethylenes and polypropylenes is used as the lubricant $e_2$), in particular an oxidized wax, the content of waxes in the aqueous composition preferably being in the range from 0.01 to 5 wt. %, particularly preferably in the range from 0.02 to 3.5 wt. %, very particularly preferably in the range from 0.05 to 2 wt. %. Preferably, the melting point of the wax employed as a lubricant is in the range from 40 to 165° C., particularly preferably in the range from 50 to 160° C., in particular in the range from 120 to 150° C. It is particularly advantageous to add, in addition to a lubricant with a melting point in the range from 120 to 165° C., a lubricant with a melting point in the range from 45 to 95° C. or with a glass transition temperature in the range from −20 to +60° C., in particular in amounts of 2 to 30 wt. %, preferably 5 to 20 wt. % of the total solids content. However, the latter can also advantageously be employed by itself.

It is particularly advantageous to employ the wax as an aqueous or as a cationically, anionically or/and sterically stabilized dispersion, because it can then easily be kept in homogeneous distribution in the aqueous composition. The aqueous composition preferably contains the at least one lubricant, which optionally can also simultaneously be a shaping agent, in a content in the range from 0.1 to 25 g/l and particularly preferably in a content in the range from 1 to 15 g/l. However, a wax content is usually only advantageous if the coating according to the invention is a treatment layer, since the wax content in a pretreatment layer can be a disadvantage during lacquering. A lubricant or/and shaping agent can be added to reduce the coefficient of friction of the coating, in particular during shaping. Paraffin, polyethylene and oxidized polyethylene, inter alia, are recommended for this.

Preferably, at least one wax together with a polymer mixture containing ethylene and acrylic acid or/and a copolymer, such as ethylene/acrylic-acid copolymer, is employed as the lubricant, optionally at least one further synthetic resin being added, in particular in an amounts ratio of wax to the copolymer containing ethylene and acrylic acid of 0.02:1 to 2:1, particularly preferably 0.05:1 to 1:1, very particularly preferably 0.1:1 to 0.5:1.

The ratio of the contents of organic film-forming agent to contents of lubricant in the aqueous composition (bath composition) can vary within wide ranges; in particular it can be ≥2:1. Preferably, this ratio is in a range from 3:1 to 50:1, particularly preferably in a range from 10:1 to 20:1.

The aqueous composition preferably contains at least one organic corrosion inhibitor $e_3$), in particular based on amine(s), preferably at least one alkanolamine—preferably a long-chain alkanolamine, at least one TPA-amine complex, such as acid adduct-4-oxo-4-p-tolyl butyrate-4-ethylmorpholine, at least one zinc salt of aminocarboxylate, of 5-nitroisophthalic acid or of cyanic acid, at least one polymeric ammonium salt with fatty acid, at least one metal salt of a sulfonic acid, such as dodecyl-naphthalenesulfonic acid, at least one amino and transition metal complex of toluenepropionic acid, 2-mercapto-benzothiazolyl-succinic acid or at least one of its amino salts, at least one conductive polymer or/and at least one thiol, it being possible for the content of organic corrosion inhibitors in the aqueous composition preferably to be in the range from 0.01 to 5 wt. %, particularly preferably in the range from 0.02 to 3 wt. %, very particularly preferably in the range from 0.05 to 1.5 wt. %.

The at least one organic corrosion inhibitor is preferably not readily volatile at room temperature. It may furthermore be advantageous if it is readily soluble in water or/and readily dispersible in water, in particular to the extent of more than 20 g/l. Compounds which are particularly preferred are, inter alia, alkylaminoethanols, such as dimethylaminoethanol, and complexes based on a TPA-amine, such as N-ethylmorpholine complex with 4-methyl-γ-oxo-benzenebutanoic acid. This corrosion inhibitor can be added in order to effect or to intensify still further a relatively powerful corrosion inhibition. The addition of the at least one organic corrosion inhibitor is usually necessary only for metallic surfaces which are very difficult to protect, such as bright steel surfaces, because of the very high corrosion-inhibiting action of the compositions according to the invention. It is advantageous if non-galvanized steel surfaces, in particular cold-rolled steel (CRS), are to be coated.

The ratio of the contents of organic film-forming agent to contents of at least one organic corrosion inhibitor in the aqueous composition (bath composition) can vary within wide ranges; in particular it can be ≤500:1. This ratio is preferably in a range from 5:1 to 400:1, particularly preferably in a range from 10:1 to 100:1.

The aqueous composition preferably contains 0.1 to 80 g/l of the at least one anticorrosion pigment $e_4$). These include, in particular, various silicates, based on aluminium silicates, alumo-silicates, alumo-alkaline earth metal silicates and alkaline earth metal silicates. The anticorrosion pigments preferably have an average particle diameter, measured on a scanning electron microscope, in the range from 0.01 to 0.5 μm diameter, in particular in the range from 0.02 to 0.3 μm. The various types of anticorrosion pigments are known in principle. However, an addition of at least one of these pigments does not seem to be necessary in principle, but renders alternative embodiment variants possible.

The agents for neutralization and/or steric stabilization of the acid groups of the synthetic resins with an acid number in particular in the range from 5 to 50 $e_5$) can be, inter alia, slowly volatilizing alkanolamines and hydroxides, such as sodium hydroxide solution and potassium hydroxide solution, but preferably rapidly volatilizing alkanolamines, ammonia and compounds based on morpholine and alkanolamines. They have the effect that the neutralized synthetic resins become water-miscible or, at an acid number from about 150, are also water-soluble.

At least one organic solvent $e_6$) can optionally also be added in the process according to the invention. At least one water-miscible or/and water-soluble alcohol, one glycol ether or N-methylpyrrolidone or/and water can be used as the organic solvent for the organic polymers, and in the case of the use of a solvent mixture, in particular a mixture of at least one long-chain alcohol, such as e.g. propylene glycol, one ester-alcohol, one glycol ether or/and butanediol with water. Preferably, however, in many cases only water is added, without any organic solvent. If an organic solvent is used, the content thereof is preferably 0.1 to 10 wt. %, in particular 0.25 to 5 wt. %, very particularly preferably 0.4 to 3 wt. %. For strip production it is preferable rather to employ only water and almost no or no organic solvent, possibly apart from small amounts of alcohol.

It is furthermore advantageous to add at least one wetting agent $e_7$) in order to be able to apply the wet film uniformly in the area extent and in the layer thickness as well as densely and without defects. Many wetting agents are suitable in principle for this, preferably acrylates, silanes, polysiloxanes, long-chain alcohols, which reduce the surface tension of the aqueous composition.

The coatings according to the invention can be largely or completely free not only from chromium(VI) compounds but also from chromium(III) compounds without thereby losing quality. Although it is not normally intended in the context of the invention to add environmentally hazardous chromium compounds $e_8$), such as, in particular, those of $Cr^{6+}$, in rare cases of use this can nevertheless be provided at the request of the customer. The aqueous composition, which is preferably free or largely free from chromium(VI) compounds, has only a chromium content of up to 0.05 wt. % on chromium-free metallic surfaces and a chromium content of up to 0.2 wt. % on chromium-containing metallic surfaces; chromium contents occurring in the bath can be dissolved out of the metallic surface by pickling attack, can originate in traces from impurity contents or can arrive carried in from previous baths or from tanks and pipelines. Preferably, no chromium is consciously added to the aqueous composition.

However, the process according to the invention can also advantageously be employed with a content of at least one chromium-containing compound if the corrosion protection is to be retained in a wide range and with a high reliability, in particular on damage to the protective layer which can be caused by mechanical stresses during transportation, storage and assembly of the substrates treated on the substrate surface with the treatment liquid according to the invention. Sodium bichromate, potassium bichromate or/and ammonium bichromate, for example, can then be added. The content of chromium(VI) compounds is then preferably 0.01 to 100 g/l, particularly preferably 0.1 to 30 g/l.

Preferably, the aqueous composition can also contain at least one basic crosslinking agent based on titanium, hafnium or/and zirconium as the cation or/and based on carbonate or ammonium carbonate as the anion, the content of such crosslinking agents in the aqueous composition preferably being in the range from 0.01 to 3 wt. %, particularly preferably in the range from 0.02 to 1.8 wt. %, very particularly preferably in the range from 0.05 to 1 wt. %.

Preferably, the aqueous composition contains at least one additive, in particular at least one chosen from the group consisting of at least one biocide, at least one defoamer or/and at least one wetting agent.

Preferably, no acids, in particular no inorganic acids or/and organic carboxylic acids, are added to the aqueous composition—under certain circumstances with the exception of the traces of acids contained hidden in the raw materials. In particular, it is free or largely free from inorganic acids or/and organic carboxylic acids, above all free from inorganic acids.

The aqueous composition according to the invention is preferably free from additions of free fluoride, complex fluoride, such as e.g. hexafluorotitanic acid or hexafluorozirconic acid, or/and fluoride bonded in other ways.

Preferably, the aqueous composition is free or largely free from heavy metals. In particular, contents of cadmium, nickel, cobalt or/and copper should be kept extremely low and should not be added. However, for the compositions according to the invention the pickling attack is usually so low that no steel-refining agents, such as e.g. chromium or nickel, can be dissolved out of a steel surface.

Particularly advantageous compositions according to the invention substantially contain, inter alia, at least one copolymer, e.g. based on acrylic-polyester-polyurethane, styrene, styrene-acrylate or/and ethylene-acrylate, as a film-forming agent, at least one silane, at least one chelate, at least one film-forming auxiliary based on a long-chain alcohol, at least one inorganic compound in particle form, in particular based on aluminium oxide, aluminium phosphide, iron oxide, iron phosphide, mica, lanthanide oxide(s), e.g. based on cerium oxide, molybdenum sulfide, graphite, carbon black, silicate, silicon dioxide, colloidal silicon dioxide, zinc oxide or/and zirconium oxide, optionally at least one lubricant, such as wax, optionally at least one wetting agent, such as polysiloxanes, optionally at least one organic corrosion inhibitor and optionally further additives, such as, inter alia, a defoamer.

The metallic surface is preferably in a freshly produced, clean or in a cleaned state. The term "clean metallic surface" here means a non-cleaned metallic, e.g. freshly galvanized surface on which no cleaning is necessary, or a freshly cleaned surface.

Preferably, the aqueous composition is applied directly to the metallic surface without applying a pretreatment composition beforehand. For some uses it may nevertheless be advantageous to apply at least one pretreatment layer, e.g. based on an alkali metal phosphating, a zinc-containing phosphating, a pretreatment containing rare earths, such as cerium, and/or at least one silane beforehand.

To prepare the bath composition from a concentrate primarily by dilution with water or for a topping-up solution for adjusting the bath composition during relatively long operation of a bath, aqueous compositions which contain most or almost all of the constituents of the bath composition but as a rule not the at least one organic compound in particle form, which is preferably kept separately and added separately, are preferably used. Reaction and drying accelerators, such as e.g. the morpholine salt of paratoluenesulfonic acid, can also advantageously be added separately. The concentrate and the topping-up solution preferably have a concentration which is concentrated five times to ten times, in respect of the individual constituents, as greatly as the bath composition. In some cases, however, the "concentrate" can also be used directly as the bath composition, optionally after a small dilution by e.g. 5 to 30%.

In the process according to the invention, the aqueous composition can preferably be applied to the metallic surface at a temperature in the range from 5 to 50° C., particularly preferably in the range from 10 to 40° C., very particularly preferably in the range from 18 to 25° C., or at 30 to 95° C. In the process according to the invention, the metallic surface can preferably be kept at temperatures in the range from 5 to 60° C. during application of the coating, particularly preferably in the range from 10 to 55° C., very particularly preferably in the range from 18 to 25° C., or under certain circumstances also at 50 to 120° C. In the process according to the invention, the coated metallic surface can preferably be dried at a temperature in the range from 20 to 400° C. for the circulating air temperature, preferably in the range from 40 to 120° C., or in the range from 140 to 350° C., very particularly preferably at 60 to 100° C. or at 160 to 300° C. for the PMT (peak metal temperature)—depending on the chemical composition of the organic film-forming agent. The dwell time needed for drying is substantially inversely proportional to the drying temperature: e.g. for strip-like material 1 to 3 s at 100° C. or 1 to 20 s at 250° C., depending on the chemical composition of the synthetic resins or polymers, or 30 min at 20° C., while polyester resins with free hydroxyl groups in combination with melamine-formaldehyde resins cannot be dried at temperatures below 120° C. On the other hand, coated shaped components, inter alia depending on the wall thickness, must be dried for significantly longer. Drying equipment based on circulating air, induction, infra-red or/and microwaves are particularly suitable for the drying. In the process according to the invention, the coated strips can preferably be wound up to a coil, optionally after cooling to a temperature in the range from 40 to 70° C.

In the process according to the invention, the aqueous composition can preferably be applied by rolling on, flooding, knife-coating on, spraying, misting, brushing or dipping and optionally by subsequent squeezing off with a roller.

The layer thickness of the coating according to the invention is preferably in the range from 0.1 to 6 μm, particularly preferably in the range from 0.2 to 5 μm, very particularly preferably in the range from 0.25 to 4 μm, in particular in the range from 0.3 to 2.5 μm.

The dried and optionally also cured film preferably has a pendulum hardness of 30 to 190 s, preferably 50 to 180 s, measured with a König pendulum hardness tester in accordance with DIN 53157. However, in some cases the König pendulum hardness is preferably in the range from 60 to 150 s, particularly preferably in the range from 80 to 120 s. Values of the pendulum hardness in the range from 100 to 150 s often occur in UV-crosslinkable coatings, while values of the pendulum hardness in the range from 40 to 80 s may occur in the coatings which are not UV-crosslinkable or are based e.g. on polymer dispersions which do not or scarcely crosslink chemically. The layers produced according to the invention are to be tested only on test specimens with chemically the same but sufficiently thick layers, but not on thin coatings in the range up to 10 μm thickness.

The dried and optionally also cured film preferably has a flexibility such that on bending over a conical mandrel in a mandrel flex test substantially according to DIN ISO 6860 for a mandrel of 3.2 mm to 38 mm diameter—but without tearing the test area—no cracks longer than 2 mm are formed that are detectable during subsequent wetting with copper sulfate by a change in colour as a result of deposition of copper on the cracked-open metallic surface. The term "substantially" here means that thicker films are conventionally characterized, and for this reason a copper sulfate test also follows here, which can reveal the defects which otherwise under certain circumstances are not visible. Demonstration of the flexibility by using the mandrel flex test and subsequent dipping of the regions shaped in this manner in a copper sulfate solution to detect defects provides a reproducible test result and has the advantage that no expensive corrosion tests, e.g. lasting 240 h, which in some cases, depending on the chemical composition and roughness of the metallic surface, can lead to different results which therefore can be compared with one another to only a limited extent, are necessary for this. In the case of baser metallic surfaces, such as aluminium alloys, for this test it is necessary first to clean the metallic surface once by pickling before the coating, in order substantially to remove the oxide layer.

The area proportions of the detached area in the T-bend test on shaped components (metal sheets) coated according to the invention and then with coil coating lacquer are preferably only up to 8%, particularly preferably up to 5%, very particularly preferably up to 2%, but the best values are at approximately 0%, so that then usually only cracks occur. A coil coating lacquer based on silicone polyester can preferably be employed for this, in particular for comparative tests in tests typical for coated coils. The absence of cracking or the size of the cracks here, however, also depends largely on the nature of the lacquer employed.

In the process according to the invention, in each case at least one coating of printing ink, foil, lacquer, lacquer-like material, powder coating, adhesive or/and adhesive carrier can preferably be applied to the dried and optionally also cured film.

In each case at least one coating of lacquer, polymer, paint, functional coatings of plastic, adhesive or/and adhesive carrier, such as e.g. a self-adhesive film, can be applied to the partly or completely dried or cured film, in particular a wet lacquer, a powder coating, a coating of plastic, an adhesive, inter alia for foil coating. The metal components coated according to the invention with the aqueous composition, in particular strips or strip sections, can be shaped, lacquered, coated with polymers, such as e.g. PVC, printed, glued, hot-soldered, welded or/and joined to one another or to other elements by clinching or other joining techniques. These processes are known in principle for coating of metallic strip for architectural uses. As a rule, lacquering or coating of another type is first carried out, and then shaping. If the coating according to the invention is lacquered or coated with plastic, solder or weld connections usually cannot be established without the coatings being removed at least locally, unless, for electrical welding, a high content of conductive particles or/and conductive polymer is incorporated into the film according to the invention and the subsequent coating is exceptionally thin.

The substrates coated according to the invention can preferably be used as wire, strip, sheet metal or a component for a wire coil, a braided wire, a steel strip, a metal sheet, a lining, a screen, a vehicle body or a component of a vehicle body, a component of a vehicle, trailer, mobile home or missile, a cover, a housing, a lamp, a light, a traffic light element, a piece of furniture or furniture element, an element of a domestic appliance, a frame, a profile, a shaped component of complicated geometry, a crash barrier, heater or fence element, a bumper, a component of or with at least one tube or/and a profile, a window, door or bicycle frame or an item of hardware, such as a screw, nut, flange, spring, or a spectacle frame.

The process according to the invention is an alternative to on the one hand the chromate-rich acid-free and on the other hand acid-containing processes mentioned, in particular in the field of surface pretreatment of metal strip before lacquering, and compared with these gives comparably good results in respect of corrosion protection and lacquer adhesion.

It is moreover possible to employ the process according to the invention for treatment of metal surfaces cleaned in the conventional manner but without subsequent after-treatment, such as rinsing with water or a suitable after-rinsing solution. The process according to the invention is particularly suitable for application of the treatment solution by means of squeeze-off rollers or by means of a so-called roll coater, it being possible for the treatment solution to be dried directly after the application without further intermediate process steps (Dry in Place technology). By this means, the process is simplified considerably e.g. compared with conventional spraying or dipping processes, in particular those with subsequent rinsing operations, such as e.g. a chromating or zinc phosphating, and only very small amounts of rinsing water for cleaning the unit after the end of work are produced, since no rinsing process after the application is necessary, which also represents an advantage compared with the already established chromium-free processes which operate by the spraying process with after-rinsing solutions. These rinsing waters can be added again to a new batch of the bath composition.

It is easily possible here to employ the polymeric, optionally chromate-free coating according to the invention without prior application of an additional pretreatment layer, so that an outstanding permanent protection of the metallic surfaces, and in particular on AlSi, ZnAl, such as Galfan®, AlZn, such as Galvalume®, ZnFe, ZnNi, such as Galvanneal® and other Zn alloys as metallic coatings or Al and Zn coatings, is possible, which can be achieved by application of a polymer-containing coating. Moreover, the coating according to the invention has also proved particularly suitable for metallic surfaces which are highly susceptible to corrosion, such as those of iron and steel alloys, in particular on cold-rolled steel, it then being advantageous to add at least one corrosion inhibitor to the aqueous composition. Flash rust formation during drying of the treatment liquid on cold-rolled steel (CRS) can be suppressed by this means.

A less expensive and more environment-friendly corrosion protection which also does not require an expensive UV curing but can be cured adequately solely with drying and film formation and optionally additionally with the "usual chemical" curing, which is often called "thermal crosslinking", can thus be achieved. In some cases, however, it may be of interest to obtain a harder coating quickly in a particular process step. It can then be advantageous if at least one photoinitiator is added and at least one UV-curable polymer component is chosen in order to achieve a partial crosslinking on the basis of actinic radiation, in particular UV radiation. The coating according to the invention can then be cured partly by actinic radiation and partly by drying and film formation or by thermal crosslinking. This can be of importance in particular during application to fast-running belt lines or for the first crosslinking (=curing). The content of so-called UV crosslinking here can be 0 to 50% of the total possible curing, preferably 10 to 40%.

The polymeric and largely or completely chromate-free coating according to the invention furthermore has the advantage that—especially at a layer thickness in the range from 0.5 to 3 μm —it is transparent and light-coloured, so that the metallic character and the typical structure e.g. of a galvanized or a Galvalume® surface can still be seen accurately and unchanged or virtually unchanged through the coating. Furthermore, such thin coatings can also be welded without problems.

The polymeric coating according to the invention moreover is very readily shapable, so that it can be adjusted such that after the coating, drying and optionally curing and optionally also in the long term it is in a relatively plastic and not in a hard, brittle state.

The polymer-containing coating according to the invention can be readily over-lacquered with most lacquers or plastics. The polymer-containing coating according to the invention can be after-lacquered or coated with plastic, such as PVC, by application processes such as e.g. powder coating, wet lacquering, flooding, rolling, brushing or dipping. The cured coatings produced by this means which are applied to the polymer-containing coating according to the invention, it often also being possible to apply two or three layers of lacquer or plastic, usually have a total layer thickness in the range from 5 to 1,500 μm.

The polymeric coating according to the invention can also be foamed on the reverse without problems, e.g. with polyurethane insulating foam, for the production of 2-sheet sandwich elements, or can readily be glued with the conventional construction adhesives such as are employed e.g. in vehicle construction.

The coatings according to the invention can be employed above all as primer layers. They are outstandingly suitable without, but also with, at least one previously applied pretreatment layer. This pretreatment layer can then be, inter alia, a coating based on phosphate, in particular ZnMnNi phosphate, or based on phosphonate, silane or/and a mixture based on a fluoride complex, corrosion inhibitor, phosphate, polymer or/and finely divided particles.

Pretreatment layers or primer layers which, together with the subsequently applied lacquer, resulted in a coating system equivalent to the best chromium-containing coating systems are achieved with the coatings according to the invention.

The process according to the invention furthermore has the advantage over the processes described and/or practised to date that on an aluminium-rich substrate or on a substrate coated with an aluminium-containing alloy —in particular a substrate of steel—it caused no darkening of the substrate surface and also no milky-white matting of the substrate surface and can therefore be employed for decoration of buildings or/and building components without additional colouring lacquering. The aesthetics of the metal surface remain unchanged.

The coatings according to the invention are exceptionally inexpensive, environment-friendly and readily usable on a large industrial scale.

It was surprising that in spite of a layer thickness of only approx. 0.5 to 2 µm, it was possible to produce an exceptionally high-quality chromium-free film with a synthetic resin coating according to the invention.

It was very surprising that by the addition of metal chelate to the aqueous composition it was possible to achieve a significant increase in the corrosion protection and also lacquer adhesion of the film formed therefrom—both in the case of aqueous compositions that contain predominantly chelate and silane and in the case of those that contain predominantly synthetic resin and in addition chelate and silane.

The adhesion-promoting action of the silanes and of their reaction products, in particular between the metallic substrate and lacquer and optionally between pigment and organic lacquer constituents, should also prevail in the compositions such as are described here in the embodiment examples, or even occur by itself, as long as polymers and chelate are not simultaneously present. It had not been expected that at high contents of high-molecular-weight polymers and copolymers, without the presence of low-molecular-weight organic contents, a significant improvement in the film properties would be achieved by the addition of chelate. The high-molecular-weight polymers and copolymers are possibly crosslinked by the presence of chelate, which is particularly advantageous in particular for those film-forming systems which have no contents of curing agent and photoinitiator. Exposure to relatively high temperatures, such as are otherwise used for thermal crosslinking, and free-radical irradiation, which are an additional expensive process step, can be avoided by this means.

EXAMPLES AND COMPARISON EXAMPLES

The examples described below are intended to explain the subject matter of the invention in more detail.

A) Compositions Substantially Based on Chelate and Silane:

For preparation of aqueous concentrates, at least one partly hydrolysed silane was aged for at least two weeks and optionally also thereby hydrolysed. Thereafter, a metal chelate according to table 1 was added. The concentrates were then diluted with water, and an agent which adapts the pH, such as ammonia, was optionally added in order to obtain ready-to-use treatment liquids. In each case 3 metal sheets of hot-galvanized steel or of Galvalume® steel sheet were then brought into contact by rolling on and drying on the corresponding treatment liquid at 25° C. The metal sheets treated in this way were dried here at 90° C. PMT and then tested for their corrosion protection.

Examples E 1 to E 8, including comparison example CE 4, show the influence of the addition of chelate or of chelate and polymer mixture. In examples E 9 to E 12 and E 13 to E 17, the amounts of silane and chelate were increased and at the same time the addition of inorganic particles was reduced, these two series differing by different amounts of polymer mixture added. Finally, the layer thicknesses were varied in examples E 9 and E 18 to E 20.

TABLE 1

Compositions based on chelate and silane and in some cases also inorganic particles, data in wt. % for concentrates and g/l for the treatment baths

| | Examples/comparison example | | | | | | | | | |
|---|---|---|---|---|---|---|---|---|---|---|
| | E 1 | E 2 | E 3 | CE4 | E 5 | E 6 | E 7 | E 8 | E 9 | E 10 |
| Concentrates | | | | | | | | | | |
| Organofunct. silane A | 15 | 15 | 15 | 30 | — | 15 | 15 | 3.3 | 1.7 | 5.1 |
| Organofunct. silane B | — | — | — | — | 15 | — | — | — | — | — |
| Titanium chelate D | 17.5 | 17.5 | 17.5 | — | — | — | — | 3.9 | 2 | 5.9 |
| Zirconium chelate E | — | — | — | — | 17.5 | — | — | — | — | — |
| Zirconium chelate F | — | — | — | — | — | 17.5 | — | — | — | — |
| Titanium chelate G | — | — | — | — | — | — | 17.5 | — | — | — |
| SiO$_2$ particles <0.2 µm | — | — | — | — | — | — | — | 11 | 13 | 9 |
| Ethanol/methanol | not added, may be formed | | | | | | | | | |
| Ammonia | small amounts added to adjust the pH to 8.3 | | | | | | | | | |
| Polymer mixture | — | — | — | — | — | — | — | 7 | 7 | 7 |
| Water | 67.5 | 67.5 | 67.5 | 70.0 | 67.5 | 67.5 | 67.5 | 74.8 | 76.3 | 73 |
| Total | 100 | 100 | 100 | 100 | 100 | 100 | 100 | 100 | 100 | 100 |
| Batches for the treatment baths | | | | | | | | | | |
| Concentrate | 10 | 20 | 30 | 20 | 20 | 20 | 20 | 53 | 53 | 53 |
| Water | 90 | 80 | 70 | 80 | 80 | 80 | 80 | 47 | 47 | 47 |
| Treatment baths | | | | | | | | | | |
| Water | 968 | 936 | 904 | 936 | 936 | 936 | 936 | 866.6 | 874.5 | 857.0 |
| Organometal comp. | 17 | 34 | 51 | — | 34 | 34 | 34 | 20.7 | 10.6 | 31.3 |
| Silane | 15 | 30 | 45 | 64 | 30 | 30 | 30 | 17.5 | 9.0 | 27.0 |
| Acrylic-polyester-polyurethanecopolymer | — | — | — | — | — | — | — | 15 | 15 | 15 |
| Styrene-acrylatecopolymer | — | — | — | — | — | — | — | 16.7 | 16.7 | 16.7 |
| Colloidal SiO$_2$ | — | — | — | — | — | — | — | 58.3 | 68.9 | 47.7 |
| Polysiloxane | — | — | — | — | — | — | — | 1 | 1 | 1 |
| Defoamer | — | — | — | — | — | — | — | 1 | 1 | 1 |
| Long-chain alcohol | — | — | — | — | — | — | — | 3.3 | 3.3 | 3.3 |
| pH | 8.3 | 8.3 | 8.3 | 8.3 | 8.3 | 8.3 | 8.3 | 8.3 | 8.3 | 8.3 |

TABLE 1-continued

Compositions based on chelate and silane and in some cases also inorganic particles, data in wt. % for concentrates and g/l for the treatment baths

Film properties

| | | | | | | | | | | |
|---|---|---|---|---|---|---|---|---|---|---|
| Layer weight, g/m$^2$ | | 0.2 | 0.4 | 0.6 | 0.2 | 0.4 | 0.4 | 0.4 | 0.8 | 0.8 | 0.8 |
| Salt spray test | 48 h | 10 | <2 | 0 | 30 | <2 | <2 | <2 | 0 | 0 | 0 |
| ASTM 3117-73: | 96 h | 20 | 10 | <2 | 60 | 10 | 10 | 10 | 0 | 0 | 0 |
| Area of corrosion in | 120 h | 40 | 20 | 5 | 90 | 20 | 20 | 20 | <2 | 0 | <2 |
| % after | 240 h | 60 | 40 | 10 | 100 | 40 | 40 | 40 | 10 | 0 | 10 |
| | 360 h | 100 | 60 | 30 | 100 | 60 | 60 | 60 | 20 | <2 | 30 |

Examples/comparison example

| | E 11 | E 12 | E 13 | E 14 | E 15 | E 16 | E 17 | E 18 | E 19 | E 20 |
|---|---|---|---|---|---|---|---|---|---|---|
| Concentrates | | | | | | | | | | |
| Organofunct. silane A | 7.5 | 11.6 | 2 | 1.2 | 3.3 | 5.1 | 7.8 | 1.7 | 1.7 | 1.7 |
| Organofunct. silane B | — | — | — | — | — | — | — | — | — | — |
| Titanium chelate D | 8.8 | 13.7 | 3.1 | 1.3 | 3.9 | 5.9 | 9.1 | 2 | 2 | 2 |
| Zirconium chelate E | — | — | — | — | — | — | — | — | — | — |
| Zirconium chelate F | — | — | — | — | — | — | — | — | — | — |
| Titanium chelate G | — | — | — | — | — | — | — | — | — | — |
| SiO$_2$ particles <0.2 μm | 6 | — | 7 | 9 | 6 | 4 | — | 13 | 13 | 13 |
| Ethanol/methanol | not added, may be formed | | | | | | | | | |
| Ammonia | small amounts added to adjust the pH to 8.3 | | | | | | | | | |
| Polymer mixture | 7 | 7 | 4.5 | 4.5 | 4.5 | 4.5 | 4.5 | 7 | 7 | 7 |
| Water | 70.7 | 67.7 | 83.4 | 84 | 82.3 | 80.5 | 78.6 | 76.3 | 76.3 | 76.3 |
| Total | 100 | 100 | 100 | 100 | 100 | 100 | 100 | 100 | 100 | 100 |
| Batches for the treatment baths | | | | | | | | | | |
| Concentrate | 53 | 53 | 53 | 53 | 53 | 53 | 53 | 40 | 27 | 13 |
| Water | 47 | 47 | 47 | 47 | 47 | 47 | 47 | 60 | 73 | 87 |
| Treatment baths | | | | | | | | | | |
| Water | 844.8 | 828.9 | 912.2 | 915.3 | 906.3 | 896.8 | 886.7 | 905.1 | 936.1 | 969.3 |
| Organometal comp. | 46.6 | 72.6 | 16.4 | 6.9 | 20.7 | 31.3 | 48.2 | 8.0 | 5.4 | 2.6 |
| Silane | 39.8 | 61.5 | 10.6 | 6.4 | 17.5 | 27.0 | 41.3 | 6.8 | 4.6 | 2.2 |
| Acrylic-polyester-polyurethane copolymer | 15 | 15 | 9.7 | 9.7 | 9.7 | 9.7 | 9.7 | 11.4 | 7.7 | 3.7 |
| Styrene-acrylate copolymer | 16.7 | 16.7 | 10.7 | 10.7 | 10.7 | 10.7 | 10.7 | 12.6 | 8.4 | 4.1 |
| Colloidal SiO$_2$ | 31.8 | — | 37.1 | 47.7 | 31.8 | 21.2 | — | 52 | 35.1 | 16.9 |
| Polysiloxane | 1 | 1 | 0.6 | 0.6 | 0.6 | 0.6 | 0.6 | 0.8 | 0.5 | 0.2 |
| Defoamer | 1 | 1 | 0.6 | 0.6 | 0.6 | 0.6 | 0.6 | 0.8 | 0.5 | 0.2 |
| Long-chain alcohol | 3.3 | 3.3 | 2.1 | 2.1 | 2.1 | 2.1 | 2.1 | 2.5 | 1.7 | 0.8 |
| pH | 8.3 | 8.3 | 8.3 | 8.3 | 8.3 | 8.3 | 8.3 | 8.3 | 8.3 | 8.3 |
| Film properties | | | | | | | | | | |
| Layer weight, g/m$^2$ | 0.8 | 0.8 | 0.5 | 0.5 | 0.5 | 0.5 | 0.5 | 0.6 | 0.4 | 0.2 |
| Salt spray test 48 h | 20 | 30 | 0 | 0 | 0 | 30 | 40 | 0 | 0 | 0 |
| ASTM 3117-73: 96 h | 30 | 40 | 0 | 0 | 0 | 40 | 60 | 0 | 0 | <2 |
| Area of corrosion in 120 h | 50 | 60 | 0 | 0 | 0 | 50 | 80 | 0 | <2 | 5 |
| % after 240 h | 70 | 80 | 10 | <2 | 10 | 70 | 100 | <2 | 5 | 10 |
| 360 h | 100 | 100 | 20 | 5 | 30 | 100 | 100 | 5 | 10 | 30 |

The film formed here was transparent, uniform and closed. The films formed showed no coloration and showed no darkening of the underlying metallic surface. This is particularly advantageous in order to be able to see structure, gloss and colour of the metallic surface practically unchanged through the coating. The combination of chelate and silane already resulted in a very clear improvement in the corrosion protection at very low layer thicknesses compared with a composition which is free from organometallic compounds. Further examples moreover showed that in particular a higher addition of inorganic particles, in this case based on SiO$_2$ having an average particle size in the range from 10 to 20 nm, made a further additional contribution to the improvement in corrosion resistance. It was surprising here that beyond small additions of such particles, an increase in the content of inorganic particles also rendered possible a clear increase in corrosion protection. Astonishingly, in spite of the sometimes high content of inorganic particles, a closed and nevertheless flexible film which was resistant to mechanical influences was possible after the coating had formed a film. The layer weight approximately divided by 1.1 gives the layer thickness in μm. The area proportions of the corrosion were estimated visually. Due to the comparatively low contents of synthetic resin(s), this thin film has rather the properties of a passivation instead of a thin organic coating, which can be shaped. The film of example 9 about 0.75 μm thin is indeed thicker than a typical chromate-rich inorganic passivation, but shows at least the same good corrosion resistance and furthermore, in contrast to the chromate-rich layer, can readily be shaped.

B) Compositions Substantially Based on Chelate, Silane and Organic Polymer: Treatment or Pretreatment of Hot-Galvanized, Alloy-Galvanized and Electrolytically Galvanized Steel Sheets:

The concentrations and compositions stated relate to the treatment solution itself and not to any preparation solutions of higher concentration used. All the concentration data are to be understood as solids contents, i.e. the concentrations relate to the weight contents of the active components, regardless of whether the raw materials employed were present in dilute form, e.g. as aqueous solutions. In addition to the compositions listed in the following, in commercial practice it may be necessary or desirable to add further additives or to adapt the amounts accordingly, for example either to increase the total amount of additives or e.g. to increase the amount of defoamer or/and flow control agent, such as e.g. a polysiloxane.

The synthetic resins employed were: a styrene-acrylate copolymer with a glass transition temperature in the range from 15 to 25° C., with a minimum film-forming temperature (MFT) in the range from 15 to 20° C. and with an average particle size in the range from 120 to 180 nm, an acrylic-polyester-polyurethane copolymer with a blocking point in the range from 140 to 180° C., an MFT in the range from 35 to 40° C. and a glass transition temperature in the range from 20 to 60° C., an ethylene-acrylic copolymer without a pronounced minimum film-forming temperature but with a melting point in the range from 70 to 90° C., and an acrylate with comparatively few hydroxyl groups, which could be crosslinked with a melamine resin, and with a number of OH groups (hydroxyl number) in the range from 20 to 60, calculated for the solid resin. The styrene-butadiene copolymer has a glass transition temperature in the range from −20 to +20° C. and an acid number in the range from 5 to 30; on the basis of the content of carboxyl groups, this copolymer is additionally crosslinkable e.g. with melamine resins or with isocyanate-containing polymers. The copolymer based on epoxide-acrylate has an acid number in the range from 10 to 18 and a glass transition temperature of between 25 and 40° C. This copolymer for coating steel in particular gives the coating according to the invention a higher chemical resistance, especially in the basic range, and improves the adhesion properties to the metallic substrate. Two different trialkoxysilanes with in each case one epoxide group were used as the organofunctional silane A and B and an ethylenediamine-silane was used as the organofunctional silane C.

The pyrogenic silica had a BET value in the range from 90 to 130 $m^2/g$, the colloidal silicon dioxide had an average particle size in the range from 10 to 20 nm. The oxidized polyethylene served as a lubricant and shaping agent (wax) and had a melting point in the range from 60 to 165° C., preferably in the range from 80 to 110 or even up to 150° C., particularly preferably in the range from 100 to 140° C. The polysiloxane employed was a polyether-modified dimethylpolysiloxane and served as a wetting agent and flow control agent for the wet film during application. The defoamer was a mixture of hydrocarbons, hydrophobic silica, oxalized compounds and nonionic emulsifiers. A butyl ether based on propylene glycol or a mixture with a similar glycol ether of even faster volatility than this butyl ether was used as the long-chain alcohol for the film formation.

Steel sheets which were obtained from commercially available cold rolled and subsequently a) alloy-galvanized steel strip with 55 wt. % Al in AlZn (Galvalume®), with 5 wt. % Al in ZA (Galfan®), with approx. 2 wt. % Al in ZnAl (crack-free steel), b) hot-galvanized steel strip c) hot-aluminized steel strip and d) electrolytically galvanized steel strip, which were oiled for the purpose of protection during storage, were first degreased in a mildly alkaline spray cleaner, rinsed with water, dried at elevated temperature and then treated with the aqueous composition according to the invention. A defined amount of the aqueous composition (bath composition) was applied here with the aid of a roll coater such that a wet film thickness of approx. 10 $ml/m^2$ resulted, the concentration being doubled for a dry film thickness of 2 $g/m^2$. The constituents were mixed in part in the sequence stated and the pH of the solution was then in each case adjusted to 8.0 to 8.5 with an ammonia solution or a solution of rapidly volatilizing alkanolamine. The wet film was then dried on at temperatures in the range from 80 to 100° C. PMT, subjected to film formation and cured. Selected compositions of the bath composition are mentioned in table 2. The steel sheets treated in this manner were then tested for their corrosion protection and their mechanical properties (table 3). However, only the results on hot-galvanized steel sheets are shown in this table, because these are among the materials which are most difficult to protect against corrosion and among the materials tested, in addition to electrolytically galvanized steel sheets, gave the worst results. However, since electrolytically galvanized steel sheets are normally never installed outside without subsequent lacquering because of their increased susceptibility to corrosion, testing of hot-galvanized steel sheets which are relatively difficult to render resistant to corrosion and nowadays are employed more frequently without lacquering is the most appropriate.

TABLE 2

Composition of the aqueous treatment liquid of the examples and comparison examples, data in g/l

| | Examples according to the invention | | | | | | | | | | | | | | | |
|---|---|---|---|---|---|---|---|---|---|---|---|---|---|---|---|---|
| | E21 | E22 | E23 | E24 | E25 | E26 | E27 | E28 | E29 | E30 | E31 | E32 | E33 | E34 | E35 | E36 |
| Water content of solvents in wt. % | 900 | 900 | 900 | 900 | 900 | 900 | 900 | 900 | 900 | 900 | 900 | 900 | 900 | 900 | 900 | 900 |
| Acrylic-polyester-polyurethane copolymer | 28.0 | 28.0 | 28.0 | 28.0 | 28.0 | 28.0 | 38.5 | 35.0 | 31.5 | 44.6 | — | 28.0 | 28.0 | 28.0 | 28.0 | 28.0 |
| Styrene-acrylate | 19.6 | 18.6 | 16.6 | 14.6 | 12.6 | 10.6 | 27.1 | 23.6 | 20.1 | — | 44.6 | 16.6 | 16.6 | 16.6 | 16.6 | 16.6 |
| Ethylene-acrylic acid copolymer | 28.0 | 28.0 | 28.0 | 28.0 | 28.0 | 28.0 | 7.0 | 14.0 | 21.0 | 28.0 | 28.0 | 28.0 | 28.0 | 28.0 | 28.0 | 28.0 |
| Colloidal $SiO_2$ | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 |
| Oxidized polyethylene | 5.8 | 5.8 | 5.8 | 5.8 | 5.8 | 5.8 | 5.8 | 5.8 | 5.8 | 5.8 | 5.8 | 5.8 | 5.8 | 5.8 | 5.8 | 5.8 |
| Titanium chelate D | 3.0 | 3.0 | 3.0 | 3.0 | 3.0 | 3.0 | 3.0 | 3.0 | 3.0 | 3.0 | 3.0 | 3.0 | — | — | 3.0 | 3.0 |
| Zirconium chelate E | — | — | — | — | — | — | — | — | — | — | — | — | 3.0 | — | — | — |
| Zirconium chelate F | — | — | — | — | — | — | — | — | — | — | — | — | — | 3.0 | — | — |
| Titanium chelate G | — | — | — | — | — | — | — | — | — | — | — | — | — | — | 3.0 | — | — |
| Organofunctional silane A | 1.0 | 2.0 | 4.0 | 6.0 | 8.0 | 10.0 | 4.0 | 4.0 | 4.0 | 4.0 | 4.0 | 4.0 | 4.0 | 4.0 | — | — |
| Organofunctional silane B | — | — | — | — | — | — | — | — | — | — | — | — | — | — | 4.0 | — |

TABLE 2-continued

Composition of the aqueous treatment liquid of the examples and comparison examples, data in g/l

| | | | | | | | | | | | | | | | | |
|---|---|---|---|---|---|---|---|---|---|---|---|---|---|---|---|---|
| Organofunctional silane C | — | — | — | — | — | — | — | — | — | — | — | — | — | — | — | 4.0 |
| Polysiloxane | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Defoamer | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Long-chain alcohol | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |

| | Comparison examples | | | | | | | | | | | | | | |
|---|---|---|---|---|---|---|---|---|---|---|---|---|---|---|---|
| | CE21 | CE22 | CE23 | CE24 | CE25 | CE26 | CE27 | CE28 | CE29 | CE30 | CE31 | CE32 | CE33 | CE34 | CE35 |
| Water | 900 | 900 | 900 | 900 | 900 | 900 | 900 | 900 | 900 | 900 | 900 | 900 | 900 | 900 | 900 |
| Acrylic-polyester-polyurethane copolymer | 28.0 | 28.0 | 28.0 | 28.0 | 28.0 | 48.6 | — | 38.5 | 35.0 | 31.5 | 28.0 | 28.0 | 28.0 | 28.0 | 30.9 |
| Styrene acrylate | 22.6 | 21.6 | 20.6 | 19.6 | 18.6 | — | 48.6 | 31.1 | 27.6 | 24.1 | 20.6 | 20.6 | 20.6 | 23.6 | 23.5 |
| Ethylene-acrylic acid copolymer | 28.0 | 28.0 | 28.0 | 28.0 | 28.0 | 28.0 | 28.0 | 7.0 | 14.0 | 21.0 | 28.0 | 28.0 | 28.0 | 28.0 | 28.0 |
| Colloidal SiO$_2$ | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 |
| Oxidized polyethylene | 5.8 | 5.8 | 5.8 | 5.8 | 5.8 | 5.8 | 5.8 | 5.8 | 5.8 | 5.8 | 5.8 | 5.8 | 5.8 | 5.8 | — |
| Titanium chelate D | 1.0 | 2.0 | 3.0 | 4.0 | 5.0 | 3.0 | 3.0 | 3.0 | 3.0 | 3.0 | — | — | — | — | 3.0 |
| Zirconium chelate E | — | — | — | — | — | — | — | — | — | — | 3.0 | — | — | — | — |
| Zirconium chelate F | — | — | — | — | — | — | — | — | — | — | — | 3.0 | — | — | — |
| Titanium chelate G | — | — | — | — | — | — | — | — | — | — | — | — | 3.0 | — | — |
| Polysiloxane | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Defoamer | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Long-chain alcohol | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |

Results of the Tests on Hot-Galvanized Metal Sheets and on Galvalume® Steel Sheets:

The dry layer application of the dried, film-formed and cured polymer-containing coatings on hot-galvanized metal sheets (HDG) in each case gave values in the range from 950 to 1,050 mg/m$^2$ or from 1,900 to 2,100 mg/m$^2$ for the virtually 1 or virtually 2 μm thick films respectively in all the experiments—apart from in comparison example 4. The dried films had a layer thickness in the range from 0.8 to 1 μm or from 1.7 to 2 μm. All the coatings were transparent, colourless and uniform. They showed a slight silk gloss, so that the optical character of the metallic surface remained detectable practically unchanged.

To evaluate the shapability of the film of the treatment liquid applied and dried on the Galvalume® substrate surface, the pin-on-disc test was employed. Galvalume® was employed because, on the basis of its high aluminium content, this coating is more difficult to shape on steel sheet than the other zinc-containing alloys mentioned here. This laboratory test method enables the investigations to be carried out under reproducible conditions which can be adhered to within very narrow limits. The results determined can thereby be compared with one another in an optimum manner.

Test Method in the Pin-on-Disc Test:

A steel ball with a diameter of 7.5 mm circulates in circles on the steel surface, which has been treated with the aqueous organic composition, under a pressure of 20 N at a speed of 10 mm/s at a room temperature of 20-22° C. and a relative atmospheric humidity of 35 to 40%. During the measurement the coefficient of friction arising due to the movement of the steel ball on the organic coating under the conditions described is measured and recorded with the aid of a computer.

An organic film is desired, prepared with the aqueous treatment liquid, which after drying and film formation
1. shows the lowest possible coefficient of friction, where
2. the coefficient of friction should remain largely constant during the longest possible shaping time and, in spite of the friction and roughening of the surface of the organic coating with the ball, should not rise to a relatively high degree—measured in the pin-on-disc test by the number of circuits the ball can cover before a coefficient of friction of 0.4 is measured.

TABLE 3

Test results of the non-lacquered, organically treated hot-galvanized steel sheets in respect of corrosion protection, friction and shapability, in E 37 Galvalume ® steel sheets for comparison.

| | Dry layer application 1 g/m$^2$: Salt spray test ASTM B 117-73 Area of corrosion in % after | | | Dry layer application 2 g/m$^2$: Salt spray test ASTM B 117-73 Area of corrosion in % after | | | Pin-on-disc test: Starting coefficient of friction | Pin-on-disc test: Number of circular movements until the coefficient of friction of 0.40 is exceeded |
|---|---|---|---|---|---|---|---|---|
| | 120 h | 240 h | 360 h | 120 h | 240 h | 360 h | | |
| Examples | | | | | | | | |
| E 21 | 5 | 15 | 30 | 0 | 0 | 0 | 0.16 | 140 |
| E 22 | <2 | 10 | 15 | 0 | 0 | 0 | 0.16 | 140 |
| E 23 | 0 | 0 | <2 | 0 | 0 | 0 | 0.16 | 140 |
| E 24 | 0 | 0 | <2 | 0 | 0 | 0 | 0.16 | 140 |

TABLE 3-continued

Test results of the non-lacquered, organically treated hot-galvanized steel sheets in respect of corrosion protection, friction and shapability, in E 37 Galvalume ® steel sheets for comparison.

| | Dry layer application 1 g/m$^2$: Salt spray test ASTM B 117-73 Area of corrosion in % after | | | Dry layer application 2 g/m$^2$: Salt spray test ASTM B 117-73 Area of corrosion in % after | | | Pin-on-disc test: Starting coefficient of friction | Pin-on-disc test: Number of circular movements until the coefficient of friction of 0.40 is exceeded |
|---|---|---|---|---|---|---|---|---|
| | 120 h | 240 h | 360 h | 120 h | 240 h | 360 h | | |
| E 25 | 0 | 0 | <2 | 0 | 0 | 0 | 0.16 | 140 |
| E 26 | 0 | 0 | <2 | 0 | 0 | 0 | 0.16 | 140 |
| E 27 | 0 | 0 | <2 | 0 | 0 | 0 | 0.16 | 140 |
| E 28 | 0 | 0 | <2 | 0 | 0 | 0 | 0.16 | 10 |
| E 29 | 0 | 0 | <2 | 0 | 0 | 0 | 0.16 | 50 |
| E 30 | 0 | 0 | <2 | 0 | 0 | 0 | 0.16 | 120 |
| E 31 | 0 | 0 | <2 | 0 | 0 | 0 | 0.16 | 140 |
| E 32 | 0 | 0 | <2 | 0 | 0 | 0 | 0.16 | 140 |
| E 33 | 0 | 0 | <2 | 0 | 0 | 0 | 0.16 | 140 |
| E 34 | 0 | 0 | <2 | 0 | 0 | 0 | 0.16 | 140 |
| E 35 | 0 | 0 | <2 | 0 | 0 | 0 | 0.16 | 140 |
| E 36 | 0 | 0 | <2 | 0 | 0 | 0 | 0.16 | 140 |
| E 37 | 0 | 0 | 0* | 0 | 0 | 0 | 0.16 | 140 |
| Comparision Examples | | | | | | | | |
| CE 21 | 80 | 100 | 100 | 10 | 20 | 30 | 0.16 | 140 |
| CE 22 | 80 | 100 | 100 | 5 | 10 | 20 | 0.16 | 140 |
| CE 23 | 20 | 40 | 60 | 0 | <2 | 5 | 0.16 | 140 |
| CE 24 | 20 | 40 | 60 | 0 | <2 | 5 | 0.16 | 140 |
| CE 25 | 20 | 40 | 60 | 0 | <2 | 5 | 0.16 | 140 |
| CE 26 | 20 | 40 | 60 | 0 | <2 | 5 | 0.16 | 140 |
| CE 27 | 20 | 40 | 60 | 0 | <2 | 5 | 0.16 | 140 |
| CE 28 | 80 | 100 | 100 | 10 | 20 | 40 | 0.16 | 140 |
| CE 29 | 20 | 40 | 60 | 5 | 10 | 20 | 0.16 | 140 |
| CE 30 | 20 | 40 | 60 | 0 | 5 | 10 | 0.16 | 10 |
| CE 31 | 20 | 40 | 60 | 0 | <2 | 5 | 0.16 | 50 |
| CE 32 | 20 | 40 | 60 | 0 | <2 | 5 | 0.16 | 120 |
| CE 33 | 20 | 40 | 60 | 0 | <2 | 5 | 0.16 | 140 |
| CE 34 | 100 | 100 | 100 | 100 | 100 | 100 | 0.16 | 140 |
| CE 35 | 20 | 40 | 60 | 0 | <2 | 5 | >0.8 | Not applicable |

In E 37, instead of the hot-galvanized steel sheets, Galvalume® steel sheets which had been coated as described for E 23 were used. In the salt spray test, a low point corrosion which made up <2 per cent of the area resulted only in a test time of 720 h.

The combination of chelate and silane resulted in a very clear improvement in the corrosion protection, as can be seen from the comparison of examples E 23 and E37 in comparison, so that in the case of the aqueous compositions according to the invention containing organic polymer, it was possible to leave out the organic corrosion inhibitor, apart from for the treatment of non-coated steel, without sacrificing corrosion resistance. Furthermore, it was found in the pin-on-disc test, surprisingly, that a combination of oxidized polyethylene and an ethylene-acrylic acid copolymer is particularly advantageous, if the copolymer content is not too low, for ensuring a permanent lowering of the coefficient of friction during a long-lasting shaping process. The test results showed that the most difficult shaping processes for production of elements of extreme geometry can be carried out even without abrasion of metal from the substrate surface, which allows the production of mouldings with aesthetically pleasing surfaces by shaping processes after the organic coating.

Further tests were furthermore carried out to evaluate the lacquer adhesion and corrosion resistance of metal sheets pretreated organically with the aqueous composition and subsequently coated with white lacquer:

A large part of the substrate surfaces treated with the treatment liquids on hot-galvanized steel sheets was over-lacquered with lacquer systems which are employed in general industry for the production of consumer goods, such as e.g. washing machines, refrigerators, shelf systems or office furniture, from steel. The lacquer systems employed here were a) a white thermally crosslinking acrylic lacquer based on organic solvents and acrylic resin solutions of 40±5 μm dry layer thickness after 20 min at 180° C. stoving temperature or b) a white powder coating based on a polyester-epoxide mixed powder of 60±5 μm dry layer thickness after 20 min at 180° C. stoving temperature, which are employed commercially for coating so-called white goods. In CE 36, hot-galvanized steel sheets which were coated only with the particular lacquer, without organic pretreatment, were employed here. In E 37, instead of the hot-galvanized steel sheets, Galvalume® steel sheets which had been coated as described for E 23 were used for comparison.

TABLES 4/4a

Results of the corrosion tests and the adhesion tests on alternate exposure at 20° C. in normal atmospheric humidity and at 40° C. in 100% atmospheric humidity after coating with the acrylic lacquer or with the powder coating on pretreatment layers about 1 μm thick.

| | Dry layer application 1 g/m$^2$: Salt spray test ASTM B 117-73 Under-migration in mm after 360 h | | Damp heat alternating atmosphere according to DIN 50017 KFW 20 cycles Cross-hatch in Gt at 1 mm grid distance according to DIN EN ISO 2409 | | Corrosion: Under-migration in mm | |
|---|---|---|---|---|---|---|
| | Crack | Cut edge | Before KFW test | After KFW test | At crack | At cut edge |
| Examples/comparison examples with acrylic lacquer | | | | | | |
| E 23 | 10 | 8 | Gt 1 | Gt 1 | 0 | 0 |
| E 29 | 9 | 8 | Gt 1 | Gt 1 | 0 | 0 |
| E 30 | 11 | 8 | Gt 1 | Gt 1 | 0 | 0 |
| E 31 | 12 | 7 | Gt 1 | Gt 1 | 0 | 0 |
| E 32 | 10 | 9 | Gt 1 | Gt 1 | 0 | 0 |
| E 33 | 9 | 8 | Gt 1 | Gt 1 | 0 | 0 |
| E 34 | 12 | 8 | Gt 1 | Gt 1 | 0 | 0 |
| E 35 | 12 | 7 | Gt 1 | Gt 1 | 0 | 0 |
| E 36 | 11 | 8 | Gt 1 | Gt 1 | 0 | 0 |
| E 37 | 8 | 5 | Gt 1 | Gt 1 | 0 | 0 |
| CE 24 | 15 | 12 | Gt 1 | Gt 2 | 1 | 1 |
| CE 31 | 17 | 12 | Gt 1 | Gt 3 | 2 | 1 |
| CE 32 | 16 | 13 | Gt 1 | Gt 2 | 1 | 2 |
| CE 33 | 18 | 12 | Gt 1 | Gt 3 | 2 | 1 |
| CE 34 | 30 | 20 | Gt 1 | Gt 2 | 3 | 5 |
| CE 35 | 16 | 11 | Gt 1 | Gt 3 | 2 | 4 |
| CE 36 | detached over a large area | detached over a large area | Gt 1 | Gt 5 | 10 blistering | 8 blistering |
| Examples/comparison examples with powder coating | | | | | | |
| E 23 | 1 | 1 | Gt 0 | Gt 0 | 0 | 0 |
| E 29 | 1 | 2 | Gt 0 | Gt 0 | 0 | 0 |
| E 30 | 1 | 1 | Gt 0 | Gt 0 | 0 | 0 |
| E 31 | 2 | 1 | Gt 0 | Gt 0 | 0 | 0 |
| E 32 | 2 | 2 | Gt 0 | Gt 0 | 0 | 0 |
| E 33 | 1 | 1 | Gt 0 | Gt 0 | 0 | 0 |
| E 34 | 1 | 1 | Gt 0 | Gt 0 | 0 | 0 |
| E 35 | 2 | 2 | Gt 0 | Gt 0 | 0 | 0 |
| E 36 | 1 | 2 | Gt 0 | Gt 0 | 0 | 0 |
| E 37 | 0 | 0 | Gt 0 | Gt 0 | 0 | 0 |
| CE 24 | 5 | 4 | Gt 0 | Gt 2 | 0 | 1 |
| CE 31 | 4 | 4 | Gt 0 | Gt 1 | 0 | 1 |
| CE 32 | 3 | 3 | Gt 0 | Gt 2 | 0 | 0 |
| CE 33 | 4 | 4 | Gt 0 | Gt 2 | 1 | 0 |
| CE 34 | 3 | 3 | Gt 0 | Gt 2 | 0 | 1 |
| CE 35 | 3 | 4 | Gt 0 | Gt 2 | 0 | 0 |
| CE 36 | detached over a large area | detached over a large area | Gt 2 | Gt 5 | 5 | 5 |

The results of the salt spray test on over-lacquered metal sheets show that the acrylic lacquer coating as expected did not ensure quite such a good corrosion resistance as the powder coating. However, how much the silane chelate pretreatment makes up can be seen by comparison of the examples according to the invention with comparison example 36. The corrosion data of the salt spray test can be classified as very good to excellent.

Since no difference occurs in the lacquer adhesion results before and after the damp heat alternating test, the rating Gt 1 is primarily to be attributed to the lacquer and not to the pretreatment, where Gt 1 is to be regarded as good. The results of the damp heat alternating atmosphere tests show very good to excellent lacquer adhesion values, especially when the lacquer quality, the particularly corrosion-sensitive metallic surface and the exceptionally thin organic pretreatment layer at about 1 μm are taken into account. The damp heat alternating atmosphere test in respect of under-migration is too insensitive for this type of corrosion testing on systems which are so good.

All the results of tables 4/4a show, in comparison with tests on the best chromate-containing organic coatings of the same layer thickness, which contain polymers which are per se of a very high polymeric quality, that the now chromate-free organic coatings without exception are already equivalent in corrosion protection and in lacquer adhesion to the chromate-containing coatings at a layer thickness of about 1 μm layer thickness. It is thus ensured that an equivalent substitution of environment-friendly materials is possible without problems in series production. To the knowledge of the Applicant, such a result for organic coatings has not yet hitherto been achieved anywhere!

It is moreover to be taken into account that the organic films according to the invention have a very high resistance to weathering and, in contrast to many other organic coatings, can be employed in the long term outside and under UV irradiation. Many lacquer systems, crosslinked thermally and by free radicals, such as those based on epoxy resins, are of only limited suitability for use outside.

The invention claimed is:

1. A process comprising
contacting a metallic surface that is at least one of clean, pickled, cleaned or pretreated with an aqueous composition having a solids content to form a film on the metallic surface to form a coated substrate, which is then dried to partly or completely compact the formed dried film,
wherein the dried film has a layer thickness in the range from 0.01 to 10 μm, for pretreatment before a further coating or for treatment,
wherein the aqueous composition has a pH of from 4 to 9.5 and is largely or completely free of chromium(VI) compounds, and comprises water and:
a) at least one hydrolyzable or at least partly hydrolyzed silane, wherein said partly hydrolyzed silane is an epoxy silane;
b) a metal chelate selected from the group consisting of a metal lactate; a metal ammonium lactate, a metal citrate, a metal dialkylcitrate, and a metal dialkylester-citrate;
c) an organic film-forming agent comprising at least one of a water-soluble, organic polymer, a water-dispersible organic polymer, a water soluble organic copolymer, or a water-dispersible organic-copolymer with an acid number in the range from 3 to 250 and wherein the organic film-forming agent, based on the solids the composition, is present in an amount of >45 wt. % and contains an acid group,
wherein said organic film-forming agent further comprises at least one member selected from the group consisting of
acrylic-polyester-polyurethane copolymer,
acrylic-polyester-polyurethane-styrene copolymer,
acrylic acid ester,
acrylic acid ester-methacrylic acid ester, optionally with at least one of free acids or acrylonitrile,
ethylene-acrylic mixture,
ethylene-acrylic copolymer,
ethylene-acrylic-polyester copolymer,
ethylene-acrylic-polyurethane copolymer,
ethylene-acrylic-polyester-polyurethane copolymer,
ethylene-acrylic-polyester-polyurethane-styrene copolymer,
ethylene-acrylic-styrene copolymer,
polyester resins with free carboxyl groups combined with melamine-formaldehyde resins,
a synthetic resin mixture or copolymer based on acrylate and styrene,
a synthetic resin mixture or copolymer based on styrene-butadiene,
a synthetic resin mixture or copolymer of acrylate and epoxide,
an acrylic-modified polyester containing carboxyl groups together with melamine-formaldehyde and ethylene-acrylic copolymer,
polycarbonate-polyurethane,
polyester-polyurethane,
styrene,
styrene-vinyl acetate,
vinyl acetate,
vinyl ester and
vinyl ether;
d) a long-chain alcohol; and
e) an inorganic compound, wherein the inorganic compound is in particle form,
wherein the aqueous composition further comprises a crosslinking agent based on a hafnium cation, wherein the content of the crosslinking agent in the aqueous composition is in the range from 0.01 to 3 wt. %,
wherein the organic film-forming agent contains a content of at least one copolymer with an acid number in the range from 3 to 80 to the extent of at least 50 wt. % of the synthetic resins added, wherein the content of the at least one silane in the aqueous composition, including the reaction products formed therefrom, is from 0.1 to 50 g/l, and wherein the molecular weights of the synthetic resins added are in the range of at least 1,000 u.

2. A process according to claim 1, wherein the aqueous composition further comprises at least one selected from the group consisting of
e1) at least one inorganic compound in particle form with an average particle diameter, measured on a scanning electron microscope, in the range from 0.005 to 0.3μm diameter,
e2) at least one lubricant,
e3) at least one organic corrosion inhibitor,
e4) at least one anticorrosion pigment,
e5) at least one agent for neutralization or for steric stabilization of the synthetic resins,
e6) at least one organic solvent,
e7) at least one siloxane and
e8) at least one chromium(VI) compound.

3. A process according to claim 1, wherein at least 30 wt. % of the organic film-forming agent comprises film-formable thermoplastic resins.

4. A process according to claim 1, wherein the organic film-forming agent comprises at least 40 wt. % of a high-molecular-weight polymer.

5. A process according to claim 1, wherein the aqueous composition further comprises a member selected from the group consisting of ammonia, an amine and an alkali metal compound.

6. A process according to claim 1, wherein the aqueous composition contains 0.1 to 980 g/l of the organic film-forming agent.

7. A process according to claim 1, wherein the silane comprises at least one epoxide group, or a silanol corresponding to said silane or a siloxane corresponding to said silane.

8. A process according to claim 1, wherein the silane comprises a member selected from the group consisting of
glycidoxyalkyltri alkoxysi lane,
(epoxycycloalkyl)alkyltrialkoxysilane, and
(epoxyalkyl)trialkoxysilane.

9. A process according to claim 1, wherein the silane is selected from the group consisting of
3-glycidoxypropyltriethoxysilane,
3-glycidoxypropyltrimethoxysilane,
3-(triethoxysilyl)propyl-succinic acid-silane,
beta-(3,4-epoxycyclohexyl)ethyltriethoxy-silane,
beta-(3,4-epoxycyclohexyl)ethyltrimethoxy-silane, beta-(3,4-epoxycyclohexyl)methyltriethoxy-silane,
beta-(3,4-epoxycyclohexyl)methyltrimethoxy-silane,
gamma-(3,4-epoxycyclohexyl)propyltriethoxysilane,
gamma-(3,4-epoxycyclohexyl)propyltrimethoxysilane,
(3,4-epoxybutyl)triethoxysilane, and
(3,4-epoxybutyl)trimethoxysilane.

10. A process comprising contacting a metallic surface that is at least one of clean, pickled, cleaned or pretreated with an aqueous composition having a solids content to form a film on the metallic surface, which is then dried to partly or completely compact the formed film, and optionally curing the film,
wherein the dried and optionally cured film has a layer thickness in the range from 0.01 to 10 μm, for pretreatment before a further coating or for treatment,
wherein the aqueous composition has a pH of from 4 to 9.5 and is largely or completely free of chromium(VI) compounds, and comprises water and:
a) at least one hydrolyzable or at least partly hydrolyzed silane, wherein said silane is an epoxy silane
b) at least one metal chelate selected from the group consisting of an acetoacetate, an acetonate, an alkylenediamine, an amine, a lactacte, a carboxylic acid, a citrate and a glycol, wherein the content of the at least one chelate in the aqueous composition, including the any reaction products formed therefrom, is from 0.1 to 80g/l;
c) at least one organic film-forming agent with an acid number of from 13 to 250 which contains at least one of a water soluble organic polymer, a water dispersible organic polymer, a water soluble copolymer, or a water dispersible copolymer and wherein the organic film-forming agent, based on the solids content of the composition, is present in an amount of >45 wt. %,
wherein said organic film-forming agent further comprises at least one member selected from the group consisting of
acrylic-polyester-polyurethane copolymer,
acrylic-polyester-polyurethane-styrene copolymer,
acrylic acid ester,
acrylic acid ester-methacrylic acid ester, optionally with at least one of free acids or acrylonitrile,
ethylene-acrylic mixture,
ethylene-acrylic copolymer,
ethylene-acrylic-polyester copolymer,
ethylene-acrylic-polyurethane copolymer,
ethylene-acrylic-polyester-polyurethane copolymer,
ethylene-acrylic-polyester-polyurethane-styrene copolymer,
ethylene-acrylic-styrene copolymer,
polyester resins with free carboxyl groups combined with melamine-formaldehyde resins,
a mixture or copolymer based on acrylate and styrene,
a mixture or a copolymer based on styrene-butadiene,
a synthetic resin mixture or copolymer of acrylate and epoxide,
an acrylic-modified polyester containing carboxyl groups together with melamine-formaldehyde and ethylene-acrylic copolymer, polycarbonate-polyurethane, polyester-polyurethane, styrene, styrene-vinyl acetate, vinyl acetate, vinyl ester and vinyl ether; and
d) at least one long-chain alcohol as a film-forming auxiliary,
wherein the aqueous composition further comprises a crosslinking agent based on a hafnium cation, wherein the content of the crosslinking agent in the aqueous composition is in the range from 0.01 to 3 wt. %.

11. A process according to claim 1, wherein the inorganic compound is a finely divided powder, a dispersion or a suspension.

12. A process according to claim 1, wherein the inorganic compound is based on at least one compound selected from the group consisting of aluminum, barium, cerium, calcium, lanthanum, silicon, titanium, yttrium, zinc and zirconium.

13. A process according to claim 1, wherein the inorganic compound is based on at least one member selected from the group consisting of aluminum oxide, barium sulfate, cerium dioxide, silicon dioxide, silicate, titanium oxide, yttrium oxide, zinc oxide and zirconium oxide.

14. A process according to claim 1, wherein the aqueous composition contains 0.1 to 500 g/l of inorganic compound.

15. A process according to claim 1, wherein the aqueous composition further comprises organic corrosion inhibitor based on a member selected from the group consisting of amine, an alkanolamine, a TPA-amine complex, an alkylaminoethanol, a zinc salt of aminocarboxylate, of 5-nitro-isophthalic acid or of cyanic acid, a polymeric amino salt with fatty acid, a metal salt of a sulfonic acid, an amino and transition metal complex of toluenepropionic acid, 2-mercapto-benzothiazolyl-succinic acid or an ammonium salt thereof, a conductive polymer and a thiol, wherein the content of organic corrosion inhibitors in the aqueous composition is in the range from 0.01 to 5 wt. %.

16. A process according to claim 1, wherein no inorganic acids and organic carboxylic acids are added to the aqueous composition.

17. A process according to claim 1, wherein the long-chain alcohol is selected from the group consisting of a diol, a butyl glycol, a butyl diglycol, an ester-alcohol, an ethylene glycol, an ethylene glycol ether, a glycol ether, a diethylene glycol, triethylene glycol, a polyether, a polyethylene glycol, a polyethylene glycol ether, a polyglycol, a polypropylene glycol glycols, a propylene glycol, a propylene glycol ether, a polypropylene glycol ether, glycol ester and a trimethylpentanediol diisobutyrate, wherein the content of the long-chain alcohol is in the range from 0.01 to 10 wt. % by weight of the aqueous composition.

18. A process according to claim 1, wherein the aqueous composition further comprises at least one wax selected from the group consisting of paraffins, polyethylenes and polypropylenes,
wherein the content of the wax in the aqueous composition is in the range from 0.01 to 5 wt. %.

19. A process according to claim 1, wherein the aqueous composition further comprises a lubricant, wherein the lubricant comprises a wax and a polymer mixture or a copolymer of ethylene and acrylic acid.

20. A process according to claim 1, wherein the coating is cured partly by drying and partly by at least one method selected from the group consisting of actinic radiation, cationic polymerization and thermal crosslinking.

21. A process according to claim 1, wherein the aqueous composition further comprises an additive selected from the group consisting of a biocide, a defoamer and a wetting agent.

22. A process according to claim 1, wherein the aqueous composition is applied to the metallic surface at a temperature in the range from 5 to 50° C.

23. A process according to claim 1, wherein the metallic surface is kept at a temperature in the range from 5 to 60° C. during application of the coating.

24. A process according to claim 1, wherein the coated metallic surface is dried at a temperature in the range from 20 to 400° C. for the circulating air temperature.

25. A process according to claim 1, wherein the coated strips are wound up to a coil.

26. A process according to claim 1, wherein the aqueous composition is applied by an application method selected from the group consisting of rolling, flooding, knife-coating, spraying, misting, brushing and dipping.

27. A process according to claim 1, wherein the dried film has a pendulum hardness of 30 to 190 s, measured with a König pendulum hardness tester in accordance with DIN 53157.

28. A process according to claim 1, wherein the dried film has a flexibility such that on bending over a conical mandrel in a mandrel flex test substantially in accordance with DIN ISO 6860 for a mandrel of 3.2 mm to 38 mm diameter, but without tearing the test area, no cracks longer than 2 mm which are detectable on subsequent wetting with copper sulfate by a change in color due to deposition of copper on the torn-open metallic surface are formed.

29. A process according to claim 1, wherein at least one coating selected from the group consisting of printing ink, foil, lacquer, lacquer-like material, powder coating, adhesive and adhesive carrier is applied to the dried film.

30. A process according to claim 1, wherein the coated substrate is subject to at least one further step selected from the group consisting of shaping, lacquering, coating with polymers, printing, gluing, hot-soldering, welding and joining to one another or to other elements by clinching.

31. The process according to claim 1, wherein said metal chelate is metal lactate.

32. The process according to claim 1, wherein said metal chelate is metal ammonium lactate.

33. The process according to claim 1, wherein said metal chelate is metal citrate.

34. The process according to claim 1, wherein said metal chelate is metal dialkylcitrate.

35. The process according to claim 1, wherein said metal chelate is metal dialkylester-citrate.

36. A process according to claim 1, wherein the inorganic compound has an average particle diameter, measured on a scanning electron microscope, in the range from 0.005 to 0.3 μm diameter.

37. A process comprising
contacting a metallic surface that is at least one of clean, pickled, cleaned or pretreated with an aqueous composition having a solids content to form a film on the metallic surface, which is then dried to partly or completely compact the formed dried film, wherein the dried film has a layer thickness in the range from 0.01 to 10 μm, for pretreatment before a further coating or for treatment,
wherein the aqueous composition has a pH of from 4 to 9.5 and is largely or completely free of chromium(VI) compounds, and wherein the aqueous composition comprises water and:
a) at least one hydrolyzable or at least partly hydrolyzed silane, wherein said silane is an epoxy silane;
b) a metal chelate selected from the group consisting of a metal lactate; a metal ammonium lactate, a metal citrate, a metal lactate, a metal dialkylcitrate, and a metal dialkylester-citrate;
c) an organic film-forming agent which comprises at least one of a water soluble, organic polymer, a water dispersible organic polymer, a water soluble organic copolymer, or a water dispersible organic copolymer with an acid number in the range from 3 to 250 and wherein the content of organic film-forming agent, based on the solids the composition, is present in an amount of >45 wt. %"; and
d) at least one long-chain alcohol,
wherein the aqueous composition further comprises a crosslinking agent based on a hafnium cation, wherein the content of the crosslinking agent in the aqueous composition is in the range from 0.01 to 3 wt. %.

38. A process comprising
contacting a metallic surface that is at least one of clean, pickled, cleaned or pretreated with an aqueous composition having a solids content to form a film on the metallic surface, which is then dried to partly or completely compact the formed dried film,
wherein the dried film has a layer thickness in the range from 0.01 to 10 μm, for pretreatment before a further coating or for treatment,
wherein the aqueous composition has a pH of from 4 to 9.5 and is largely or completely free of chromium(VI) compounds, and comprises water and:
a) at least one hydrolyzable or at least partly hydrolyzed silane, wherein said silane is an epoxy silane;
b) a metal chelate selected from the group consisting of a metal ammonium lactate, a metal lactate, a metal citrate, a metal dialkylcitrate, and a metal dialkylester-citrate;
c) a copolymer with an acid number in the range from 3 to 250 and wherein the content of organic film-forming agent, based on the solids the composition, is present in an amount of >45wt. %; and
d) at least one long-chain alcohol,
wherein the aqueous composition further comprises a crosslinking agent based on a hafnium cation, wherein the content of the crosslinking agent in the aqueous composition is in the range from 0.01 to 3 wt. %.

39. A process comprising contacting a metallic surface that is at least one of clean, pickled, cleaned or pretreated with an aqueous composition having a solids content to form a film on the metallic surface, which is then dried to partly or completely compact the formed film,
wherein the dried film has a layer thickness in the range from 0.01 to 10 μm, for pretreatment before a further coating or for treatment,
wherein the aqueous composition has a pH of from 4 to 9.5 and is largely or completely free of chromium(VI) compounds, and comprises water and:
a) at least one hydrolyzable or at least partly hydrolyzed silane, wherein said silane is an epoxy silane;
b) at least one metal chelate based on
alkali metal lactate,
alkanolamine,
alkyl acetoacetate,
alkylenediamine tetraacetate,
ammonium lactate,
citrate,
dialkyl citrate,
dialkyl ester-citrate,
dialkylenetriamine,
diisoalkoxybisalkyl acetoacetate,
diisopropoxybisalkyl acetoacetate,
di-n-alkoxy-bisalkyl acetoacetate,
hydroxyalkylenediamine triacetate,
trialkanolamine and
trialkylenetetramine;
c) at least one organic film-forming agent which contains at least one of a water soluble polymer, a water dispersible polymer, a water soluble organic polymer, a water soluble organic copolymer and a water dispersible copolymer with an acid number in the range from 3 to 250, wherein the content of organic film-forming agent, based on the solids content of the composition, is >45 wt. %, and
wherein said organic film-forming agent further comprises at least one member
selected from the group consisting of
acrylic-polyester-polyurethane copolymer,
acrylic-polyester-polyurethane-styrene copolymer,
acrylic acid ester,
acrylic acid ester-methacrylic acid ester, optionally with at least one of free acids or acrylonitrile,
ethylene-acrylic mixture,
ethylene-acrylic copolymer,
ethylene-acrylic-polyester copolymer,
ethylene-acrylic-polyurethane copolymer,
ethylene-acrylic-polyester-polyurethane copolymer,
ethylene-acrylic-polyester-polyurethane-styrene copolymer,
ethylene-acrylic-styrene copolymer,
polyester resins with free carboxyl groups combined with melamine-formaldehyde resins,
a mixture or copolymer based on acrylate and styrene,
a mixture or copolymer based on styrene-butadiene,
a mixture or copolymer of acrylate and epoxide,
an acrylic-modified polyester containing carboxyl groups together with melamine-formaldehyde and ethylene-acrylic copolymer,
polycarbonate-polyurethane,
polyester-polyurethane,
styrene,
styrene-vinyl acetate,
vinyl acetate,
vinyl ester and
vinyl ether; and
d) at least one long-chain alcohol as a film-forming auxiliary,
wherein the aqueous composition further comprises a crosslinking agent based on a hafnium cation, wherein the content of the crosslinking agent in the aqueous composition is in the range from 0.01 to 3 wt. %.

40. A process for coating a metallic surface with an aqueous composition, the process comprising contacting the clean, pickled, cleaned or pretreated metallic surface with the aqueous composition with metallic surface to form a film thereon, wherein the film is then dried,
wherein the dried film has a layer thickness in the range from 0.01 to 10 μm free from chromium(VI) compounds, for pretreatment before a further coating or for treatment,
wherein the aqueous composition comprises water and,
a) a hydrolysable or at least partly hydrolyzed silane,
b) a metal chelate which has only a low reactivity in the aqueous composition,
c) an organic film-forming agent which contains at least one water soluble or water dispersible organic polymer or/and copolymer with an acid number in the range from 3 to 250 and wherein the content of organic film-forming agent, based on the solids content of the composition, is >45 wt. %, and
d) at least one long-chain alcohol as a film-forming auxiliary,
wherein the aqueous composition further comprises a crosslinking agent based on a hafnium cation, wherein the content of the crosslinking agent in the aqueous composition is in the range from 0.01 to 3 wt. %.

41. A process according to claim 40, wherein the aqueous composition further comprises at least one component e) selected from the group consisting of
e1) an inorganic compound in particle form with an average particle diameter, measured on a scanning electron microscope, in the range from 0.005 to 0.3 μm diameter,
e2) a lubricant,
e3) an organic corrosion inhibitor,
e4) an anticorrosion pigment,
e5) an agent for neutralization or/and for steric stabilization of the synthetic resins,
e6) an organic solvent, and
e7) a siloxane.

42. A process according to claim 40, wherein the organic film-forming agent is a synthetic resin mixture of a polymer or a copolymer which contains a content of synthetic resin based on a member selected from the group consisting of acrylate, epoxide, ethylene, urea-formaldehyde, phenol, polyester, polyurethane, styrene, and styrene-butadiene.

43. A process according to claim 40, wherein the organic film-forming agent comprises as a synthetic resin a content of a member selected from the group consisting of organic polymer, copolymer or/and mixtures thereof based on polyethylenimine, polyvinyl alcohol, polyvinylphenol, polyvinylpyrrolidone and polyaspartic acid.

44. A process according to claim 40, wherein the organic film-forming agent contains a content of at least one copolymer with an acid number in the range from 3 to 80.

45. A process according to claim 40, wherein the organic film-forming agent contains at least one component based on a member selected from the group consisting of
acrylic-polyester-polyurethane copolymer, acrylic-polyester-polyurethane-styrene copolymer,
acrylic acid ester,
acrylic acid ester-methacrylic acid ester, optionally with free acids or/and acrylonitrile,
ethylene-acrylic mixture,
ethylene-acrylic copolymer,
ethylene-acrylic-polyester copolymer,
ethylene-acrylic-polyurethane copolymer,
ethylene-acrylic-polyester-polyurethane copolymer,
ethylene-acrylic-polyester-polyurethane-styrene copolymer,
ethylene-acrylic-styrene copolymer,
polyester resins with free carboxyl groups combined with melamine-formaldehyde resins,
a synthetic resin mixture or/and copolymer based on acrylate and styrene,
a synthetic resin mixture or/and copolymer based on styrene-butadiene,
a synthetic resin mixture or/and copolymer of acrylate and epoxide,
based on an acrylic-modified polyester containing carboxyl groups together with melamine-formaldehyde and ethylene-acrylic copolymer,
polycarbonate-polyurethane,
polyester-polyurethane,
styrene,
styrene-vinyl acetate,
vinyl acetate,
vinyl ester and
vinyl ether.

46. A process according to claim 40, wherein at least 30 wt. % of the organic film-forming agent comprises film-formable thermoplastic resins.

47. A process according to claim 40, wherein the molecular weight of the synthetic resin is in the range of at least 1,000 u.

48. A process according to claim 40, wherein the organic film-forming agent contains at least 40 wt. % of high-molecular-weight polymers.

49. A process according to claim 40, wherein acid groups of the synthetic resins are stabilized with a member selected from the group consisting of ammonia, amine, morpholine, dimethylethanolamine, diethylethanolamine, triethanolamine and an alkali metal compound.

50. A process according to claim 40, wherein the aqueous composition contains 0.1 to 980 g/l of the organic film-forming agent.

51. A process according to claim 40, wherein the aqueous composition contains at least one silane selected from the group consisting of acyloxysilane, one alkoxysilane, one silane with at least one amino group, one silane with at least one succinic acid group or/and succinic acid anhydride group, one bis-silyl-silane, one silane with at least one epoxide group, one (meth)acrylate-silane, one multi-silyl-silane, one ureidosilane, one vinylsilane or/and at least one silanol and a siloxane.

52. A process according to claim 40, wherein the silane is selected from the group consisting of
glycidoxyalkyltrialkoxysi lane,
methacryloxyalkyltrialkoxysilane,
(trialkoxysilyl)alkyl-succinic acid-silane,
aminoalkylaminoalkylalkyldialkoxysilane,
(epoxycycloalkyl)alkyltrialkoxysilane,
bis-(trialkoxysilylalkyl)amine,
bis-(trialkoxysilyl)ethane,
(epoxyalkyl)trialkoxysilane,
aminoalkyltrialkoxysilane,
ureidoalkyltrialkoxysilane,
N-(trialkoxysilylalkyl)alkylenediamine,
N-(aminoalkyl)aminoalkyltrialkoxysilane,
N-(trialkoxysilylalkyl)dialkylenetriamine,
poly(aminoalkyl)alkyldialkoxysilane,
tris(trialkoxysilyl)alkyl isocyanurate,
ureidoalkyltrialkoxysilane and
acetoxysilane.

53. A process according to claim 40, wherein the silane is selected from the group consisting of
3-glycidoxypropyltriethoxysilane,
3-glycidoxypropyltrimethoxysilane,
3-methacryloxypropyltriethoxysilane,
3-methacryloxypropyltrimethoxysilane,
3-(triethoxysilyl)propyl-succinic acid-silane,
Aminoethylaminopropylmethyldiethoxysilane,
aminoethylaminopropylmethyldimethoxysilane,
beta-(3,4-epoxycyclohexyl)ethyltriethoxy-silane,
beta-(3,4-epoxycyclohexyl)ethyltrimethoxy-silane,
beta-(3,4-epoxycyclohexyl)methyltriethoxy-silane,
beta-(3,4-epoxycyclohexyl)methyltrimethoxy-silane,
gamma-(3,4-epoxycyclohexyl)propyltriethoxysilane,
gamma-(3,4-epoxycyclohexyl)propyltrimethoxysilane,
bis(triethoxysilylpropyl)amine,
bis(trimethoxysilylpropyl)amine,
(3,4-epoxybutyl)triethoxysilane,
(3,4-epoxybutyl)trimethoxysilane,
(gamma-aminopropyltriethoxysilane,
(gamma-aminopropyltrimethoxysilane,
(gamma-ureidopropyltrialkoxysilane,
(N-(3-(trimethoxysilyl)propyl)ethylenediamine,
(N-beta-(aminoethyl)-gamma-aminopropyltri-ethoxy-silane,
(N-beta-(aminoethyl)-gamma-aminopropyltri-methoxysilane,
(N-(gamma-triethoxysilylpropyl)diethylene-triamine,
(N-(gamma-trimethoxysilylpropyl)diethylene-triamine,
(N-(gamma-triethoxysilylpropyl)dimethylene-triamine,
(N-(gamma-trimethoxysilylpropyl)dimethylene-triamine,
(poly(aminoalkyl)ethyldialkoxysilane,
(poly(aminoalkyl)methyldialkoxysilane,
(tris(3-(triethoxysilyl)propyl) isocyanurate
(tris(3-(trimethoxysilyl)propyl) isocyanurate and
(vinyltriacetoxysilane.

54. A process according to claim 40, wherein the content of the silane in the aqueous composition, including the reaction products formed therefrom, is preferably 0.1 to 50 g/l.

55. A process according to claim 40, wherein the at least one metal chelate is the group consisting of a chelate complex based on a member selected from the group consisting of an acetoacetate, an acetonate, an alkylenediamine, an amine, a lactate, a carboxylic acid, a citrate and a glycol wherein the content of the at least one chelate in the aqueous composition, including the reaction products formed therefrom, 0.1 to 80 g/l.

56. A process according to claim 40, wherein the metal chelate is selected from the group consisting of
alkali metal lactate,
alkanolamine,
alkyl acetoacetate,
alkylenediamine tetraacetate,
ammonium lactate,
citrate,
dialkyl citrate,
dialkyl ester-citrate,
dialkylenetriamine,
diisoalkoxybisalkyl acetoacetate,
diisopropoxybisalkyl acetoacetate,
di-n-alkoxy-bisalkyl acetoacetate,
hydroxyalkylenediamine triacetate,
trialkanolamine and
trialkylenetetramine.

57. A process according to claim 40, wherein the inorganic compound is selected from the group consisting of a carbonate, oxide, silicate and sulfate.

58. A process according to claim 40, wherein the inorganic compound is selected from the group consisting of aluminum, barium, cerium, calcium, lanthanum, silicon, titanium, yttrium, zinc and zirconium.

59. A process according to claim 40, wherein the inorganic particles are based on at least one member selected from the group consisting of aluminum oxide, barium sulfate, cerium dioxide, silicon dioxide, silicate, titanium oxide, yttrium oxide, zinc oxide and zirconium oxide.

60. A process according to claim 40, wherein the aqueous composition contains 0.1 to 500 g/l of the inorganic compound.

61. A process according to claim 40, wherein the aqueous composition contains at least one organic corrosion inhibitor, alkanolamine, a TPA-amine complex, an alkylaminoethanol, a zinc salt of aminocarboxylate, a zinc salt of 5-nitro-isophthalic acid, a zinc salt of cyanic acid, a polymeric amino salt of fatty acid, a metal salt of a sulfonic acid, an amino and transition metal complex of toluenepropionic acid, an amino and transition metal complex of 2-mercapto-benzothiazolyl-succinic acid, a conductive polymer and a thiol, wherein the content of the organic corrosion inhibitor in the aqueous composition is in the range from 0.01 to 5 wt. %.

62. A process according to claim 40, wherein no inorganic acids or organic carboxylic acids are added to the aqueous composition.

63. A process according to claim 40, wherein the long-chain alcohol is selected from the group consisting of diols, block copolymers of ethylene oxide and propylene oxide, butanediols, propanediols, decanediols, butyl glycols, butyl diglycols, ester-alcohols, ethylene glycols, ethylene glycol ethers, glycol ethers, diethylene glycols, triethylene glycols, polyethers, polyethylene glycols, polyethylene glycol ethers, polyglycols, polypropylene glycols, propylene glycols, propylene glycol ethers, polypropylene glycol ethers, glycol ethers, trimethylpentanediol diisobutyrates, wherein the content of the long-chain alcohol in the aqueous composition is in the range from 0.01 to 10 wt. %.

64. A process according to claim 40, wherein the lubricant is selected from the group consisting of paraffins, polyethylenes and polypropylenes, wherein the content of lubricant in the aqueous composition is in the range from 0.01 to 5 wt. %.

65. A process according to claim 40, wherein the lubricant is a polymer mixture or copolymer comprising ethylene and acrylic acid.

66. A process according to claim 40, wherein the coating is cured partly by drying and film formation and partly by actinic radiation, cationic polymerization or/and thermal crosslinking.

67. A process according to claim 40, wherein the aqueous composition contains at least one additive selected from the group consisting of a biocide, a defoamer and a wetting agent.

68. A process according to claim 40, wherein the aqueous composition is applied to the metallic surface at a temperature in the range from 5 to 50° C.

69. A process according to claim 40, wherein the metallic surface is kept at a temperature in the range from 5 to 60° C. during application of the coating.

70. A process according to claim 40, wherein the coated metallic surface is dried using circulating air having a temperature in the range from 20 to 400° C.

71. A process according to claim 40, wherein the coated strips are wound up to a coil, optionally after cooling to a temperature in the range from 40 to 70° C.

72. A process according to claim 40, wherein the aqueous composition is applied by a method selected from the group consisting of rolling, flooding, knife-coating, spraying, misting, brushing and dipping.

73. A process according to claim 40, wherein the dried film has a pendulum hardness of 30 to 190 s, measured with a König pendulum hardness tester in accordance with DIN 53157.

74. A process according to claim 40, wherein the dried film has a flexibility such that on bending over a conical mandrel in a mandrel flex test substantially in accordance with DIN ISO 6860 for a mandrel of 3.2 mm to 38 mm diameter, but without tearing the test area, no cracks longer than 2 mm which are detectable on subsequent wetting with copper sulfate by a change in color due to deposition of copper on the torn-open metallic surface are formed.

75. A process according to claim 40, wherein a member selected from the group consisting of printing ink, foil, lacquer, lacquer-like material, powder coating, adhesive and adhesive carrier is applied to the dried and optionally also cured film.

76. A process according to claim 40, wherein the coated substrate is shaped, lacquered, coated with polymers, printed, glued, hot-soldered, welded or joined.

77. A process according to claim 1, wherein the film is cured.

78. A process according to claim 37, wherein the film is cured.

79. A process according to claim 38, wherein the film is cured.

80. A process according to claim 39, wherein the film is cured.

81. A process according to claim 40, wherein the film is cured.

82. A process according to claim 1, wherein the film is transparent.

83. A process according to claim 10, wherein the film is transparent.

84. A process according to claim 37, wherein the film is transparent.

85. A process according to claim 39, wherein the film is transparent.

86. A process according to claim 40, wherein the film is transparent.

87. A process according to claim 1, wherein the chelate is selected from the group consisting of alkali metal lactate, alkanolamine, alkyl acetoacetate, alkylenediamine tetraacetate, ammonium lactate, dialkyl citrate, dialkyl ester-citrate, dialkylenetriamine, diisoalkoxybisalkyl acetoacetate, diisopropoxybisalkyl cetoacetate di-n-alkoxy-bisalkyl acetoacetate and hydroxyalkylenediamine triacetate.

88. A process according to claim 10, wherein the chelate is selected from the group consisting of alkali metal lactate, alkanolamine, alkyl acetoacetate, alkylenediamine tetraacetate, ammonium lactate, dialkyl citrate, dialkyl ester-citrate, dialkylenetriamine, diisoalkoxybisalkyl acetoacetate, diisopropoxybisalkyl acetoacetate, di-n-alkoxy-bisalkyl acetoacetate and hydroxyalkylenediamine triacetate.

89. A process according to claim 37, wherein the chelate is selected from the group consisting of alkali metal lactate, alkanolamine, alkyl acetoacetate, alkylenediamine tetraacetate, ammonium lactate, dialkyl citrate, dialkyl ester-citrate, dialkylenetriamine, diisoalkoxybisalkyl acetoacetate, diisopropoxybisalkyl acetoacetate, di-n-alkoxy-bisalkyl acetoacetate and hydroxyalkylenediamine triacetate.

90. A process according to claim 39, wherein the chelate is selected from the group consisting of alkali metal lactate, alkanolamine, alkyl acetoacetate, alkylenediamine tetraacetate, ammonium lactate, dialkyl citrate, dialkyl ester-citrate, dialkylenetriamine, diisoalkoxybisalkyl acetoacetate, diisopropoxybisalkyl acetoacetate, di-n-alkoxy-bisalkyl acetoacetate and hydroxyalkylenediamine triacetate.

91. A process according to claim 40, wherein the chelate is selected from the group consisiting of alkali metal lactate, alkanolamine, alkyl acetoacetate, alkylenediamine tetraacetate, ammonium lactate, dialkyl citrate, dialkyl ester-citrate, dialkylenetriamine, diisoalkoxybisalkyl acetoacetate, diisopropoxybisalkyl acetoacetate, di-n-alkoxy-bisalkyl acetoacetate and hydroxyalkylenediamine triacetate.

92. A process according to claim 1, wherein the chelate is selected from the group consisting of a citrate and a lactate.

93. A process according to claim 10, wherein the chelate is selected from the group consisiting of a citrate and a lactate.

94. A process according to claim 37, wherein the chelate is selected from the group consisiting of a citrate and a lactate.

95. A process according to claim 39, wherein the chelate is selected from the group consisiting of a citrate and a lactate.

96. A process according to claim 40, wherein the chelate is selected from the group consisiting of a citrate and a lactate.

97. A process according to claim 1, wherein the chelate is selected from the group consisting of titanium citrate and titanium lactate.

98. A process according to claim 10, wherein the chelate is selected from the group consisting of titanium citrate and titanium lactate.

99. A process according to claim 37, wherein the chelate is selected from the group consisting of titanium citrate and titanium lactate.

100. A process according to claim 39, wherein the chelate is selected from the group consisting of titanium citrate and titanium lactate.

101. A process according to claim 40, wherein the chelate is selected from the group consisting of titanium citrate and titanium lactate.

102. A process according to claim 1, whereby improved corrosion resistance is achieved.

103. A process according to claim 10, whereby improved corrosion resistance is achieved.

104. A process according to claim 37, whereby improved corrosion resistance is achieved.

105. A process according to claim 39, whereby improved corrosion resistance is achieved.

106. A process according to claim 40, whereby improved corrosion resistance is achieved.

107. A process according to claim 10, wherein the at least one metal chelate is a chelate complex based on a member selected from the group consisting of an alkylenediamine, an amine, a lactate, a carboxylic acid, a citrate and a glycol, wherein the content of the at least one chelate in the aqueous composition, including the reaction products formed therefrom, preferably being 0.1 to 80 g/l.

108. A process according to claim 40, wherein the at least one metal chelate is a chelate complex based on a member selected from the group consisting of an alkylenediamine, an amine, a lactate, a carboxylic acid, a citrate and a glycol, wherein the content of the at least one chelate in the aqueous composition, including the reaction products formed therefrom, preferably being 0.1 to 80 g/l.

109. A process according to claim 10, wherein the chelate is selected from the group consisiting of alkali metal lactate, alkanolamine, alkylenediamine tetraacetate, ammonium lactate, dialkyl citrate, dialkyl ester-citrate, dialkylenetriamine, di-n-alkoxy-bisalkyl acetoacetate and hydroxyalkylenediamine triacetate.

\* \* \* \* \*